US00RE51014E

(19) United States
(12) Reissued Patent
Kim et al.

(10) Patent Number: US RE51,014 E
(45) Date of Reissued Patent: Aug. 25, 2026

(54) ELECTRONIC DEVICE AND METHOD FOR CONTROLLING IMAGE DISPLAY

(71) Applicant: SAMSUNG ELECTRONICS CO., LTD., Suwon-si (KR)

(72) Inventors: Moon-Soo Kim, Seoul (KR); Jin-Hong Jeong, Yongin-si (KR); Hwa-Yong Kang, Suwon-si (KR); Young-Kwon Yoon, Seoul (KR); Tae-ho Kim, Cheongju-si (KR)

(73) Assignee: SAMSUNG ELECTRONICS CO., LTD., Suwon-si (KR)

(21) Appl. No.: 18/907,856

(22) Filed: Oct. 7, 2024

Related U.S. Patent Documents

Reissue of:
(64) Patent No.: 10,021,319
Issued: Jul. 10, 2018
Appl. No.: 15/435,448
Filed: Feb. 17, 2017

U.S. Applications:
(63) Continuation of application No. 14/294,284, filed on Jun. 3, 2014, now Pat. No. 9,578,246.

(30) Foreign Application Priority Data

Jul. 12, 2013 (KR) ..... 10-2013-0082287

(51) Int. Cl.

| | |
|---|---|
| ***H04N 5/232*** | (2006.01) |
| ***H04N 5/262*** | (2006.01) |
| ***H04N 5/272*** | (2006.01) |
| ***H04N 23/611*** | (2023.01) |
| ***H04N 23/62*** | (2023.01) |

(Continued)

(52) U.S. Cl.
CPC ..... *H04N 5/272* (2013.01); *H04N 5/2621* (2013.01); *H04N 5/2628* (2013.01); *H04N 23/611* (2023.01); *H04N 23/62* (2023.01); *H04N 23/631* (2023.01); *H04N 23/90* (2023.01); *G06F 3/04817* (2013.01); *G06F 3/0488* (2013.01)

(58) Field of Classification Search
None
See application file for complete search history.

(56) References Cited

U.S. PATENT DOCUMENTS 5,834,107 A 11/1998 Wang et al.
6,146,747 A 11/2000 Wang et al.
(Continued)

FOREIGN PATENT DOCUMENTS

JP 2001-348725 A 12/2001
JP 2002-266219 A 9/2002
(Continued)

*Primary Examiner* — Yuzhen Ge
(74) *Attorney, Agent, or Firm* — Sughrue Mion, PLLC

(57) ABSTRACT

An electronic device and a method for controlling photographic capture. A first image is acquired by a first camera having a first viewing angle. A second image is acquired by a second camera having a second viewing angle, the second viewing angle being different from the first viewing angle. The first image is overlaid with at least one object from the second image, or an icon corresponding to the object. The first camera and the second camera are mounted to a same surface, or to disparate surfaces relative to one another. Photographic capture or control is triggered in response to movement of the object.

20 Claims, 15 Drawing Sheets

(51) Int. Cl.

| | |
|---|---|
| ***H04N 23/63*** | (2023.01) |
| ***H04N 23/90*** | (2023.01) |
| *G06F 3/04817* | (2022.01) |
| *G06F 3/0488* | (2022.01) |

(56) References Cited

U.S. PATENT DOCUMENTS 6,680,114 B2 1/2004 Kody et al.
7,443,447 B2 * 10/2008 Shirakawa ..... H04N 5/2251 348/262
7,663,662 B2 * 2/2010 Miller ..... G08B 13/19643 250/330
8,439,265 B2 * 5/2013 Ferren ..... G02B 13/0065 235/462.17
8,953,079 B2 * 2/2015 Raju ..... H04N 5/2624 348/14.02
2004/0105010 A1 * 6/2004 Osen ..... G01S 3/7864 348/211.7
2004/0116028 A1 6/2004 Bryner
2004/0256310 A1 12/2004 Cheng
2005/0118917 A1 6/2005 Khan et al.
2007/0091196 A1 * 4/2007 Miyanohara ..... H04N 23/81 348/335
2007/0279482 A1 * 12/2007 Oswald ..... H04N 7/142 348/14.02
2009/0128647 A1 * 5/2009 Fahn ..... H04N 23/695 348/E5.037
2010/0085356 A1 4/2010 Nie et al.
2010/0238327 A1 9/2010 Griffith et al.
2010/0277620 A1 11/2010 Iijima et al.
2010/0283743 A1 * 11/2010 Coddington ..... G06F 3/0485 715/702
2010/0321534 A1 * 12/2010 Kim ..... G06T 11/00 348/239
2011/0058051 A1 * 3/2011 Jeon ..... G06F 3/012 348/211.11
2011/0206285 A1 8/2011 Hodge et al.
2011/0242354 A1 10/2011 Matsumoto et al.
2012/0038747 A1 2/2012 Kim et al.
2012/0105579 A1 * 5/2012 Jeon ..... H04N 5/2258 348/38
2012/0120186 A1 * 5/2012 Diaz ..... H04N 5/2258 348/36
2012/0268641 A1 10/2012 Kazama
2013/0064531 A1 3/2013 Pillman et al.
2013/0155293 A1 6/2013 Lee et al.
2013/0155308 A1 6/2013 Wu et al.
2013/0329060 A1 * 12/2013 Yim ..... G06F 17/30244 348/207.1
2014/0063056 A1 * 3/2014 Zhong ..... G06Q 30/0641 345/633
2014/0168470 A1 * 6/2014 Yoshino ..... G06F 3/0488 348/231.7
2014/0204234 A1 * 7/2014 Nonaka ..... H04N 23/69 348/222.1
2014/0240469 A1 * 8/2014 Lee ..... H04N 13/025 348/48
2014/0252209 A1 9/2014 Land et al.

FOREIGN PATENT DOCUMENTS

JP 2005-29931 A 2/2005
JP 2005-232599 A 9/2005
JP 3824512 B2 9/2006
JP 2008-36985 A 2/2008
JP 2012-42805 A 3/2012
KR 10-2012-0043995 A 5/2012
WO 02/20668 A2 3/2002

* cited by examiner

ELECTRONIC DEVICE AND METHOD FOR CONTROLLING IMAGE DISPLAY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

[This] *The present* application *is an application for Reissue of U.S. Pat. No. 10,021,319, issue on Jul. 10, 2018, and* is a Continuation of U.S. patent application Ser. No. 14/294,284 filed on Jun. 3, 2014 *now U.S. Pat. No. 9,578,246,* which claims the priority under 35 U.S.C. § 119(a) to Korean Application Serial No. 10-2013-0082287, which was filed in the Korean Intellectual Property Office on Jul. 12, 2013 [the]. *The* entire content of which is hereby incorporated by reference.

BACKGROUND

1. Technical Field

The present disclosure relates to an electronic device, and more particularly to, an electronic device and a method for controlling an image display.

2. Description of the Related Art

The services and functions provided by electronic devices such as smart phones, tablets, and laptop computers are continually expanding. In order to increase the utility of electronic devices and to meet the demands of users, various application programs have been developed. Thousands of these applications are available, and can be downloaded, stored and executed on the electronic device, which is highly portable. Electronic devices also have ever increasing multimedia functionality, providing various multimedia entertainment services. Certain functions and features are also becoming increasingly standard. For instance, electronic devices are now almost uniformly equipped with a camera formed on the front surface or rear surface of the device, and are capable of capturing both still images and video.

When a user desires to photograph their face or figure, the user must typically enable a photographic mode of the device. The user then sets the shot composition, centering on the face or figure, configures a number of options, such as zoom, shot mode, white balance, etc., and then touches a capture button from a virtual menu on the device touch screen. The device then captures the photograph as directed.

However, often times the user's hand is unstable during the capture process. As a result, the electronic device is unstable, and resulting images are captured blurred or out of focus. Additionally, because of the limited viewing angle of the camera mounted to the device, it is impossible to capture images at certain angles. Manual adjustment is impossible to the extent that the user cannot accurate compose the photograph if the desired angle places the camera out of the user's field of vision.

SUMMARY

As described above, as conventional electronic devices now one camera formed on a front surface or on a rear surface thereof, and generally are not configured to detect a movement of a subject or an object, the range of possible viewing angles for photographic composition is limited. Accordingly, a plurality of cameras having a number of different viewing angles are integrated into the electronic device, and are configured to detect a movement while capturing a photograph or video. The movement of the object (such as a hand gesture) may be used to trigger a photographic function, such as a capture command.

Furthermore, the present invention simultaneously displays images acquired by cameras having different viewing angles.

Additionally, the present invention provides a method of photographing an image using a first camera in response to a detected movement of at least one object from an image captured in a second camera.

In accordance with one aspect of the present invention, a method of displaying images on an electronic device is provided. The method includes acquiring a first image with a first camera having a first viewing angle, acquiring a second image with a second camera having a second viewing angle different from that of the first camera, and displaying images corresponding to the first image and the second image on a display, wherein the display displays the first image overlaid with at least one object from the second image, or an icon corresponding to the object, and the first camera and the second camera are mounted to a same surface of the electronic device or to disparate surfaces relative to one another.

The second camera may have a larger viewing angle than that of the first camera, and may be configured to recognize movement of the object from the second image.

The method may further include capturing the first image in response to movement of the object.

In accordance with another aspect of the present invention, a method of controlling electronic device photographing is provided. The method includes acquiring a first image with a first camera having a first viewing angle, acquiring a second image using a second camera having a second viewing angle different from that of the first viewing angle, and altering the photographic capture of the first image in response to movement of at least one object included in the second image.

The altered photographic capture of the first image may include detecting the movement of the object, and retrieving a command for controlling the first camera in response to the detected movement.

The retrieved command may include at least one of photographing the acquired first image, popping a flash, setting a timer, and performing consecutive photographing.

The method may further include overlaying the first image with the object included in the second image, or an icon corresponding to the object.

The first camera and the second camera may be mounted to a same surface of the electronic device, or to disparate surfaces relative to one another.

In accordance with yet another aspect of the present invention, an electronic device for displaying an image is provided. The electronic device includes a displays that displays an image, a camera module including a plurality of cameras, and a controller that displays a first image acquired by a first camera and a second image acquired by a second camera having a viewing angle different from that of the first camera, wherein the display displays the first image overlaid with at least one object from the second image, or an icon corresponding to the object, and the first camera and the second camera are mounted to the same surface of the electronic device, or to disparate surfaces relative to one another.

The controller may alter photographic capture of the first image in response to movement of at least one object from the acquired second image.

The controller may determine the position of the icon on the display.

The controller may detect the movement of the object and retrieve a command for the first camera corresponding to the detected movement.

The retrieved command may include at least one of photographing the acquired first image, popping a flash, setting a timer, and performing consecutive photographing.

The controller may overlay the first image with the object from the second image or an icon corresponding to the object.

The controller may display the first image and the second image on the display in accordance with a video call.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION

Figure 1:
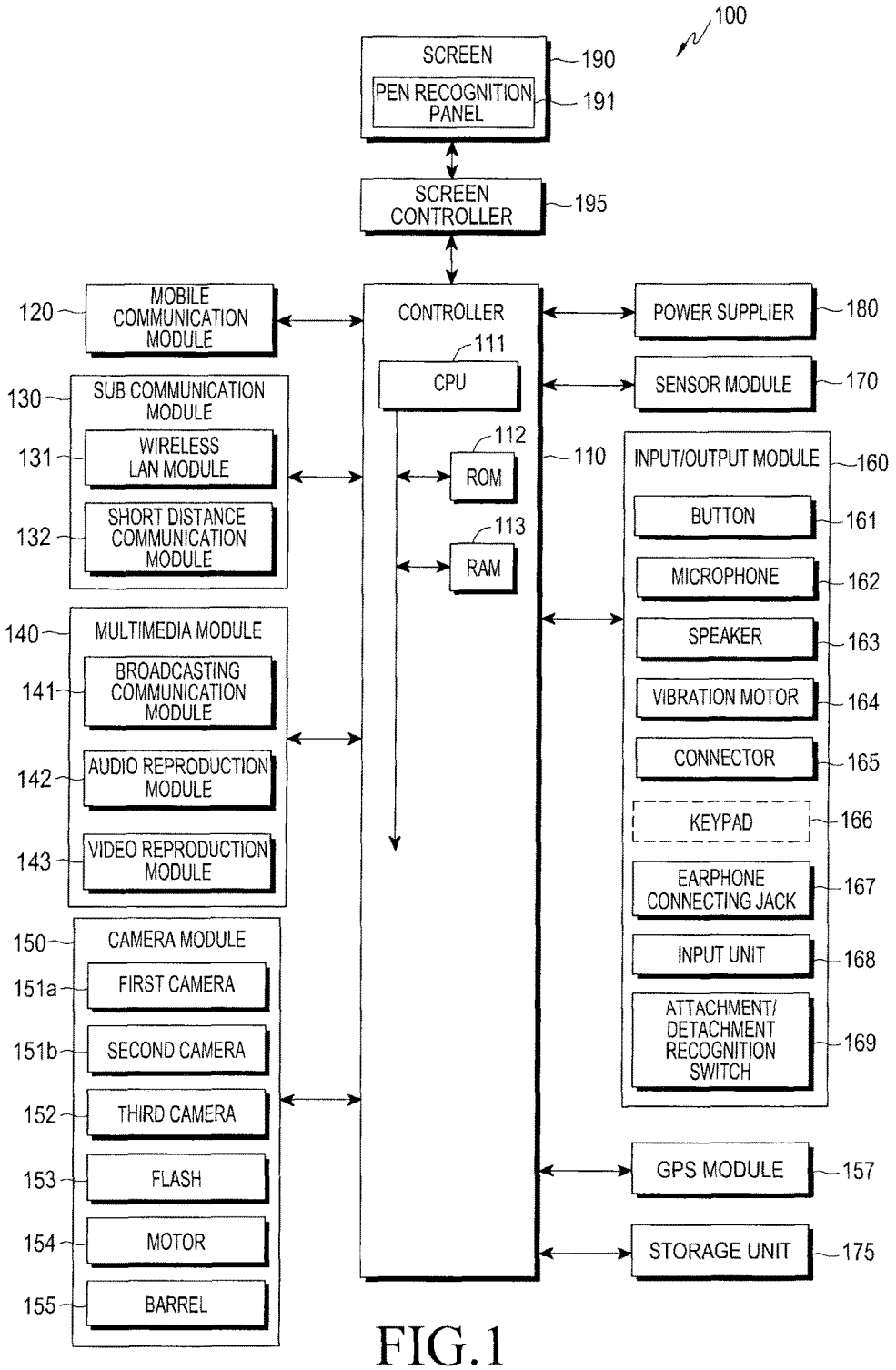
FIG. 1 is a block diagram schematically illustrating an example electronic device according to an embodiment of the present invention.

Various example embodiments will now be described more fully with reference to the accompanying drawings in which some example embodiments are shown. Therefore, it should be understood that there is no intent to limit example embodiments to the particular forms disclosed, but on the contrary, example embodiments are to cover all modifications, equivalents, and alternatives falling within the scope of the invention.

While terms including ordinal numbers, such as "first" and "second," etc., may be used to describe various components, such components are not limited by the above terms. The terms are used merely for the purpose to distinguish an element from the other elements. For example, a first element could be termed a second element, and similarly, a second element could be also termed a first element without departing from the scope of the present invention. As used herein, the term "and/or" includes any and all combinations of one or more of the associated listed items.

The terms used in this application are for the purpose of describing particular embodiments only and are not intended to be limiting of the invention. As used herein, the singular forms are intended to include the plural forms as well, unless the context clearly indicates otherwise. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless defined otherwise, all terms used herein have the same meaning as commonly understood by those of skill in the art. Such terms as those defined in a generally used dictionary are to be interpreted to have the meanings equal to the contextual meanings in the relevant field of art, and are not to be interpreted to have ideal or excessively formal meanings unless clearly defined in the present specification. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, an operation principle of embodiments of the present invention will be described in detail with reference to the accompanying drawings. In the following description of the present invention, a detailed description of known functions and configurations incorporated herein will be omitted when it may make the subject matter of the present invention rather unclear. The terms which will be described below are terms defined in consideration of the functions in the present invention, and may be different according to users, intentions of the users, or customs. Therefore, its definition will be made based on the overall contents of this specification.

First, the terms used in the present invention are defined below.

"Electronic device" refers generally to a mobile terminal which is portable, configured to transmit/receive data, and may perform a voice and video calls. The electronic device may include at least one screen. The electronic device may therefore take the form of, for example, a smart phone, a tablet PC, a 3D-TeleVision (TV), a smart TV, a Light Emitting Diode (LED) TV, and a Liquid Crystal Display (LCD) TV, and also includes all such electronic terminals which can communicate with a peripheral device or another terminal located remotely.

"Input unit" refers generally to at least one of an electronic pen and/or a stylus pen which can provide command inputs to the electronic device via a screen contact state or even in a non-contact state (such as a "hovering" motion). Furthermore, the input unit may include a human finger(s) which may input commands through a touch on a touch screen, or from hovering over a touch screen. The input unit may also include other parts of the user's body which can be used to input commands.

"Screen" may refer to display devices that are included in the electronic device, and may generally provide user interfaces for supporting visual information related to the various services provided by the device (including, for example, a phone call, data transmission, broadcasting, and taking a picture, etc.). The screen may include a touch screen configured to receive commands by inputs from, for example, the input unit (such as a stylus) and/or a user's finger, and may also include a display unit displaying at least one of data, information, and an icon.

FIG. 1 is a block diagram schematically illustrating an example electronic device according to an embodiment of the present invention. An electronic device 100 may be connected with an external device (not shown) by using at least one of a mobile communication module 120, a sub communication module 130, a connector 165, and an earphone connecting jack 167. The external device may include various devices attached to or detached from the electronic device 100 through a wire, such as an earphone, an external speaker, a Universal Serial Bus (USB) memory, a charger, a cradle/dock, a DMB (Digital Multimedia Broadcasting) antenna, a mobile payment related device, a health management device (blood sugar tester or the like), a game machine, a car navigation device and the like. Further, the external device may include a Bluetooth communication device, a Near Field Communication (NFC) device, a WiFi-Direct communication device, and a wireless Access Point (AP) which may be wirelessly connected. In addition, the electronic device 100 may be connected with another device, such as a mobile phone, a smart phone, a tablet PC, a desktop PC, and a server by using wired or wireless connection.

The electronic device 100 may include at least one screen 190 and at least one screen controller 195. Further, the electronic device 100 may include a controller 110, the mobile communication module 120, the sub communication module 130, a multimedia module 140, a camera module 150, a GPS module 157, an input/output module 160, a sensor module 170, a storage unit 175, and a power supplier 180.

The sub communication module 130 includes at least one of a wireless Local Area Network (LAN) module 131 and a short distance communication module 132. The multimedia module 140 includes at least one of a broadcasting communication module 141, an audio reproduction module 142, and a video reproduction module 143. The camera module 150 includes at least one of a first camera 151a, a second camera 151b, and a third camera 152. The first camera 151a, second camera 151b and third camera 152 may have different viewing angles. The cameras may also be configured to recognize gestures or motions (either alone or in combination with other elements, such as a processor), as well as photograph images. Further, the camera module 150 of the electronic device 100 may include at least one of a barrel 155 enabling zoom functionality for at least one of the first camera 151a, second camera 151b, and third camera 152. Likewise, a motor 154 may be provided for executing adjustment of the barrel 155. A flash 153 may provide a light source for the photography. The input/output module 160 may include at least one of a button 161, a microphone 162, a speaker 163, a vibration motor 164, a connector 165, and a keypad 166.

The controller 110 may include a CPU 111, a ROM 112 (storing, for example, a control program for controlling the electronic device 100), and a RAM 113 (used as, for example, a storage area for storing a signal or data input from the outside of the electronic device 100 or for work information performed in the electronic device 100). The CPU 111 includes a single core, a dual core, a triple core, or a quadruple core processor. The CPU 111, the ROM 112, and the RAM 113 may be communicatively coupled to one another through an internal bus.

The controller 110 may provide control, communication and coordination between the mobile communication module 120, the sub communication module 130, the multimedia module 140, the camera module 150, the GPS module 157, the input/output module 160, the sensor module 170, the storage unit 175, the power supplier 180, the screen 190, and the screen controller 195.

Further, the controller 110 may determine whether, for example, a "hovering" touch input is recognized as an input by the touchable input unit 168, in situations where the electronic pen approaches (and/or "hovers" over) one or more objects displayed on the screen 190. The controller 110 may identify the object corresponding to the position where the hovering occurs. The controller 110 may then detect the distance between the electronic device 100 and the input unit, and determine whether a hovering input event has occurred. The hovering input event may include at least one of a press of a button formed on the input unit, a knock of the input unit, a movement of the input unit with a speed faster than a predetermined speed, and a touch of the object.

The controller 110 may combine a first image acquired through the first camera 151a and a second image acquired through the second camera 151b, the first camera 151a and second camera 151b having a different viewing angle, and displays the combined image. The first and second cameras 151a and 151b may be mounted to a front surface or a rear surface of the electronic device 100 and are otherwise disposed and/or mounted on disparate surfaces from one another. Further, the first and second cameras 151a and 151b are configured to possess different viewing angles, and may recognize a movement of at least one object within the image. At least one of the first and second images includes at least one object located at an area beyond the viewing angle of the other camera. The at least one object may include various gestures such as a hand motion, a facial expression, or a body sign. The controller 110 may capture the first image via the first camera 151a upon a standard button press, or, alternatively, it may capture the first image via the first camera 151a upon detection of movement of an object from a second image captured by the second camera 151b. Alternatively, the controller 110 may recognize movement of an object in the first image acquired through the first camera 151a, which may trigger photographic capture of the second image acquired through the second camera 151b. Alternatively, recognition and detection of movement may cause the controller 110 to alter the photographic options related to capture of the image. The controller 110 overlays the first image with at least one object from the second image, or, alternatively, an icon representing the object, and then display the combined image on the display screen 190. Furthermore, the controller may alter a position of the overlaid icon on the screen.

As the first camera and the second camera have different viewing angles, the controller 110 may coordinate the combination of the first image and the second image on the display. As discussed above, the controller 110 may control or alter photographic capture of the first camera 151a in response to movement of an object detected in a second image captured by the second camera 151b. When such a triggering movement is detected, the controller 110 may retrieve a command for controlling at least one of the first and second cameras 151a or 151b, according to the detected movement. The retrieved command may include, for example, at least one command pre-stored in the storage unit 175 and is associated beforehand with at least one object. For example, one recognizable gesture may be defined as the gesture wherein the user closes their fingers transitioning from a state where the user's fingers are open. This gesture may be recognized as a command for capturing a current image. Alternative gestures may be recognized as alternative commands. For example, a gesture in which the user closes the fingers singly, one by one may be recognized as a command for setting a timer and capturing an image upon expiry of the timer. A gesture of shaking a hand from side-to-side may be recognized as a command for setting a zoom-in or zoom-out level, and then capturing the image when the desired zoom level is reached. The present invention includes a variety of gestures (such as the above-described gestures). Gestures may be utilized to control other aspects of the camera, such as to set a photographic mode of the camera, or to facilitate even more specific control of photography in accordance with or in combination with other such gestures. The extracted commands may include, for example, photographing the acquired first image, popping the flash, setting the timer, and performing consecutive photographing. The controller 110 may, as triggered by a movement of at least one object, capture an image via the first or second camera, provide the flash for the photographing, set a time for the photographing, performing consecutive photographing in a predetermined time unit, and numerous other functions as found desirable or advantageous.

The controller 110 may combine the first image (acquired by the first camera) and the second image (acquired by the second camera, having a viewing angle different from that of the first camera) by coordinating input received from the camera module 150 (including the first and second camera 151a and 151b). As previously disclosed, the first and the second camera 151a and 151b may have disparate viewing angles. The controller 110 may display at least one of the first image (acquired by the first camera) or the second image (acquired by the second camera on the screen) in response to activation of a video call. The controller 110 may also display at least one object (e.g., a hand giving instructions to the controller 11) from the first image or second image (depending on which is being used to capture imagery, and which is being used to monitor for commands from the object). As described above, the first camera 151a and the second camera 151b may have different viewing angles, and in some embodiments, at least one object captured by one camera is preferably not included in the viewing angle of the other camera.

The mobile communication module 120 may enable the electronic device 100 to connect with an external device through mobile communications by using at least one antenna or a plurality of antennas (not shown) according to the auspices of the controller 110. The mobile communication module 120 transmits/receives a wireless signal for a voice call, a video call, a Short Message Service (SMS), or a Multimedia Message Service (MMS) to/from a mobile phone (not shown), a smart phone (not shown), a tablet PC, or another device (not shown) after input into the electronic device 100 designating the target device (such as a phone number).

The sub communication module 130 may include at least one of the wireless LAN module 131 and the short distance communication module 132. For example, the sub communication module 130 may include only the wireless LAN module 131, only the near field communication module 132, or both the wireless LAN module 131 and the near field communication module 132.

The wireless LAN module 131 may be Internet-enabled when in the presence of a wireless Access Point (AP) (not shown). The wireless LAN module 131 supports a wireless LAN standard (IEEE802.11x) of the Institute of Electrical and Electronics Engineers (IEEE). The short distance communication module 132 may wirelessly perform short distance communication between the electronic device 100 and an image forming apparatus (not shown). A short distance communication scheme may include Bluetooth, Infrared Data Association (IrDA) communication, WiFi-Direct communication, Near Field Communication (NFC) and the like The electronic device 100 may include at least one of the mobile communication module 120, the wireless LAN module 131, and the short distance communication module 132. For example, the electronic device 100 may include a combination of the mobile communication module 120, the wireless LAN module 131, and the short distance communication module 132 according to a capability thereof. In the present invention, at least one of the mobile communication module 120, the wireless LAN module 131, and the short distance communication module 132 or a combination thereof is referred to as a transceiver, (the use of the term not intending to limit the scope of the present invention). Further, the transceiver may include the screen 190.

The multimedia module 140 may include the broadcasting communication module 141, the audio reproduction module 142, or the video reproduction module 143. The broadcasting communication module 141 may receive a broadcasting signal (such as, for example, a TV broadcasting signal, a radio broadcasting signal, or a data broadcasting signal) and broadcasting supplement information (such as, for example, Electric Program Guide: EPG or Electric Service Guide: ESG) output from a broadcasting station through a broadcasting communication antenna (not shown). The audio reproduction module 142 may reproduce a digital audio file (such as, for example, a file having a file extension of mp3, wma, ogg, or way) stored or received. The video reproduction module 143 may reproduce a digital video file (such as, for example, a file having a file extension of mpeg, mpg, mp4, avi, mov, or mkv) stored or received. The video reproduction module 143 may reproduce the digital audio file.

The multimedia module 140 may be implemented as including the audio reproduction module 142, the video reproduction module 143, and the broadcasting communication module 141. Furthermore, the audio reproduction module 142, or the video reproduction module 143 of the multimedia module 140 may be implemented as part of the controller 110.

The camera module 150 may include at least one of the first camera 151a, the second camera 151b, and the third camera 152. Cameras 151a, 151b, and 152 may be provided for capturing a still image or a video. Furthermore, the camera module 150 may include a barrel 155 for enabling zoom functionality, a motor 154 to automate motion of the barrel 155, or a flash 153 providing an auxiliary light source for photography. At least one of the first camera 151a and the second camera 151b may be disposed at the front surface of the electronic device 100, and the third camera may be disposed at the rear surface of the electronic device 100. Alternatively, the first camera 151 and the third camera 152 may be closely disposed to each other (such as, for example, an interval between the first camera 151 and the third camera 152 that is larger than 1 cm and smaller than 8 cm). The respective cameras may also be configured to capture three dimensional still image or a three dimensional video. In some embodiments, the second camera 151b and the third camera 152 may also be closely disposed to each other (such as, for example, an interval between the second camera 151b and the third camera 152 being larger than 1 cm and smaller than 8 cm), and may also be configured to photograph three dimensional still images or a three dimensional videos.

Furthermore, each camera 151a, 151b, and 152 may include a lens system and an image sensor. Each camera 151a, 151b, and 152 may convert an optical signal input received through the lens system to an electrical image signal, and outputs the electrical image signal to the controller 110, allowing the user to capture video or still images through the cameras 151a, 151b, and 152.

The GPS module 157 may receive radio waves from a plurality of GPS satellites (not shown) in Earth's orbit and calculate a position of the electronic device 100 by using Time of Arrival from the GPS satellites to the electronic device 100.

The input/output module 160 may include at least one of a plurality of buttons 161, the microphone 162, the speaker 163, the vibration motor 164, the connector 165, the keypad 166, the earphone connecting jack 167, and the input unit 168. The input/output module is not limited thereto, and a cursor control such as a mouse, a trackball, a joystick, or cursor direction keys may be provided to control a movement of the cursor on the screen 190.

The buttons 161 may be formed on a front surface, a side surface, or a rear surface of the housing of the electronic device 100, and may include at least one of a power/lock button (not shown), a volume button (not shown), a menu button, a home button, a back button, a search button 161.

The microphone 162 may receive a voice or a sound to generate an electrical signal.

The speaker 163 may output sounds corresponding to various signals (for example, a wireless signal, a broadcasting signal, a digital audio file, a digital video file, taking a picture or the like) of the mobile communication module 120, the sub communication module 130, the multimedia module 140, or the camera module 150 to the outside of the electronic device 100. The speaker 163 may output a sound (such as, for example, button tone corresponding to phone call, or ringing tone) corresponding to a function performed by the electronic device 100. One speaker 163 or a plurality of speakers 163 may be formed on a suitable position or positions of the housing of the electronic device 100.

The vibration motor 164 may convert an electrical signal to a mechanical vibration. For example, when the electronic device 100 in a vibration mode receives a voice call from another device (not shown), a vibration motor is triggered to provide haptic feedback to the user, notifying them of a voice call. One vibration motor 164 or a plurality of vibration motors 164 may be installed within the housing of the electronic device 100. The vibration motor 164 may also operate in response to a touch action of the user made on the screen 190 or successive movements of the touch on the screen 190.

The connector 165 may be used as an interface for connecting the electronic device 100 with an external device (not shown) or a power source (not shown). The electronic device 100 may transmit or receive data stored in the storage unit 175 of the electronic device 100 to or from an external device (not shown) through a wired cable connected to the connector 165. Further, the electronic device 100 may receive power from a power source (not shown) through the wired cable connected to the connector 165, or charge a battery (not shown) by using the power source.

The keypad 166 may receive a key input from the user for the control of the electronic device 100. The keypad 166 may include a physical keypad (not shown) formed in the electronic device 100 or a virtual keypad (not shown) displayed on the display unit 190. The physical keypad (not shown) formed in the electronic device 100 may be excluded according to a capability or structure of the electronic device 100, particularly if it employs a touch screen and a virtualized keypad.

An earphone (not shown) may be inserted into the earphone connecting jack 167 to be connected with the electronic device 100, and the input unit 168 may be included and stored within the electronic device 100 and withdrawn or detached from the electronic device 100 when being used. An attachment/detachment recognition switch 169 operating in accordance with attachment or detachment of the input unit 168 is located in one area within the electronic device 100 into which the input unit 168 is inserted, and thus may output signals corresponding to the attachment and the detachment of the input unit 168 to the controller 110. The attachment/detachment recognition switch 169 is located at an area into which the input unit 168 is inserted to directly or indirectly contact the input unit 168 when the input unit 168 is mounted. Accordingly, the attachment/detachment recognition switch 169 generates a signal corresponding to the attachment or the detachment of the input unit 168 based on the direct or indirect contact with the input unit 168 and then provides the generated signal to the controller 110.

The sensor module 170 may include at least one sensor for detecting a state of the electronic device 100. For example, the sensor module 170 may include a proximity sensor for detecting whether the user approaches the electronic device 100, an illuminance sensor (not shown) for detecting an amount of ambient light of the electronic device 100, a motion sensor (not shown) for detecting an operation (for example, a rotation of the electronic device 100, or an acceleration or a vibration applied to the electronic device 100) of the electronic device 100, a geo-magnetic sensor (not shown) for detecting a point of the compass by using the Earth's magnetic field, a gravity sensor for detecting an action direction of the gravity, and an altimeter for measuring an atmospheric pressure to detect an altitude. At least one sensor detects a state, generates a signal corresponding to the detection, and transmits the signal to the controller 110. The sensors of the sensor module 170 may be added or omitted according to the capability of the electronic device 100.

The storage unit 175 may store a signal or data input/output according to the operation of the mobile communication module 120, the sub communication module 130, the multimedia module 140, the camera module 150, the GPS module 157, the input/output module 160, the sensor module 170, or the screen 190. The storage unit 175 may store a control program for controlling the electronic device 100 or the controller 110, and applications such as a memo note, a diary, an S-note, and Microsoft Word by which data can be input through the screen, and store data input through the application.

The term "storage unit" includes the storage unit 175, the ROM 112 and the RAM 113 within the controller 110, or a memory card (not shown) (for example, an SD card or a memory stick) installed in the electronic device 100. The storage unit may include a non-volatile memory, a volatile memory, a Hard Disk Drive (HDD), or a Solid State Drive (SSD).

Further, the storage unit 175 may store applications having various functions such as a navigation function, a video call function, a game function, and a time based alarm function, images for providing a Graphical User Interface (GUI) related to the applications, user information, a document, databases or data related to a method of processing a touch input, background images (a menu screen, an idle screen or the like) or operating programs required for driving the electronic device 100, and images photographed by the camera module 150. The storage unit 175 may comprise a machine readable medium, and the term of the machine-readable medium may be defined as a medium providing data to the machine such that the machine performs a specific function. The machine-readable medium may be a storage medium. The storage unit 175 may include a non-volatile medium and a volatile medium. Both media should be tangible so that commands transmitted through the media can be detected by a physical mechanism that reads the commands through the machine.

The machine-readable medium includes at least one of a floppy disk, a flexible disk, a hard disk, a magnetic tape, a Compact Disc Read-Only Memory (CD-ROM), an optical disk, a punch card, a paper tape, a Random Access Memory (RAM), a Programmable Read-Only Memory (PROM), an Erasable PROM (EPROM), and a flash-EPROM, but is not limited thereto.

The power supplier 180 may supply power to one battery or a plurality of batteries (not shown) arranged at the housing of the electronic device 100. The one battery or the plurality of batteries (not shown) supply power to the electronic device 100. Further, the power supplier 180 may supply power input from an external power source (not shown) through a wired cable connected to the connector 165 to the electronic 100. In addition, the power supplier 180 may supply power wirelessly input from the external power source through a wireless charging technology to the electronic device 100.

Further, the electronic device 100 may include at least one screen providing user interfaces corresponding to various services (for example, a call, data transmission, broadcasting, and photography) to the user. Each screen may transmit an analog signal corresponding to at least one touch input into the user interface to the corresponding screen controller. As described above, the electronic device 100 may include a plurality of screens, and each of the screens may include a screen controller receiving an analog signal corresponding to a touch. The screens may be connected with a plurality of housings through hinge connections, respectively, or the plurality of screens may be located at one housing without the hinge connection. The electronic device 100 according to the present invention may include at least one screen as described above, and one screen will be described hereinafter for convenience of the description.

The screen 190 may receive at least one touch through a user's body (such as, for example, fingers including a thumb) or a touchable input unit (such as, for example, a stylus pen or an electronic pen). Further, the screen 190 includes a pen recognition panel 191 which recognizes an input made using a pen such as the stylus pen or the electronic pen, and the pen recognition panel 191 may detect a distance between the pen and the screen 190 through a magnetic field. Further, the screen 190 may receive successive movements of one touch among the at least one touch. The screen 190 may transmit an analog signal corresponding to the successive movements of the input touch to the screen controller 195.

The touch according to the present invention is not limited to the contact between the screen 190 and the user's body or the touchable input unit, and may include a non-contact input (which is defined by an interval which can be detected without the contact between the screen 190 and the user's body or the touchable input unit). The interval which can be detected by the screen 190 may be changed according to a capability or a structure of the electronic device 100. Particularly, the screen 190 is configured to output different values (such as, for example, a voltage value or a current value as an analog value) detected by a touch event and a hovering event so that the direct touch event and a noncontact input event can be distinguished. Further, for hovering inputs, it is preferable that the screen 190 alters outputs depending on a distance between the input unit and the screen 190.

The screen 190 may be implemented as a resistive type, a capacitive type, an infrared type, or an acoustic wave type touch screen.

Further, the screen 190 may include two or more touch screen panels which can detect touches or approaches of the user's body and the touchable input unit in order to sequentially or simultaneously receive inputs by the user's body and the touchable input unit. The two or more touch screen panels provide different output values to the screen controller, and the screen controller may distinguish between an input by the user's body or an input by the touchable input unit 168. Further, the screen 190 displays one or more objects.

More specifically, the screen 190 may be formed in a structure in which a panel (for detecting the input by the input unit 168 through a change in an induced electromotive force) and a second panel (for detecting the contact between the screen 190 and the finger) are sequentially laminated in a state such that the panels are attached to each other or only partially separated from each other. The screen 190 includes a plurality of pixels and displays an image through the pixels. The screen 190 may use a Liquid Crystal Display (LCD), an Organic Light Emitting Diode (OLED), or a Light Emitting Diode (LED).

Further, the screen 190 may include a plurality of sensors detecting a position where the input unit 168 is placed when the input unit 168 contacts a surface of the screen 190 or when it is placed within a predetermined distance from the screen 190. Each of the plurality of sensors may be formed in a coil structure. In a sensor layer consisting of the plurality of sensors, the respective sensors have preset patterns and form a plurality of electrode lines. When the contact or the hovering input is generated on the screen 190 through the finger or the input unit 168, a detection signal is generated because the waveform is changed due by the magnetic field between the sensor layer and the input unit, which in turn is generated by such a structure. The screen 190 then transmits the generated detection signal to the controller 110. Alternatively, when contact is generated on the screen 190 through the finger, the screen 190 transmits a detection signal due to capacitance to the controller 110. A predetermined distance between the input unit 168 and the screen 190 may be detected through the intensity of a magnetic field formed by a coil 430.

The screen 190 may display an image acquired through at least one of the cameras 151a, 151b, and 152. The screen 190 may display an image combined from images acquired through at least one of the first to third cameras 151a, 151b, and 152. The screen 190 may display the image acquired by the first camera to be overlaid with the image acquired by the second camera or displays the image acquired by the first camera to be overlaid with at least one object included in the image acquired by the second camera or an icon or an emoticon corresponding to the at least one object. Further, the screen 190 may display the image acquired by the second camera to be overlaid with the image acquired by the first camera or display the image acquired by the second camera to be overlaid with at least one object included in the image acquired by the first camera or an icon or an emoticon corresponding to the at least one object. In addition, the screen 190 displays an icon or an emoticon of which a position is controlled. Further, the screen 190 displays the image acquired by each of the cameras after controlling a size of the image.

Meanwhile, the screen controller 195 may convert an analog signal received from the screen 190 to a digital signal (for example, X and Y coordinates) and transmit the converted digital signal to the controller 110. The controller 110 may control the screen 190 by using the digital signal received from the screen controller 195. For example, the controller 110 may allow a short-cut icon (not shown) or an object displayed on the screen 190 to be selected or executed in response to a touch event or a hovering event. Further, the screen controller 195 may be included in the controller 110.

Furthermore, the screen controller 195 may identify a distance between a space between the a hovering input unit 168 and the screen 190 by detecting a value output through the screen 190, convert the identified distance value to a digital signal (such as, for example, a Z coordinate), and then provide the converted digital signal to the controller 110.

Figure 2:
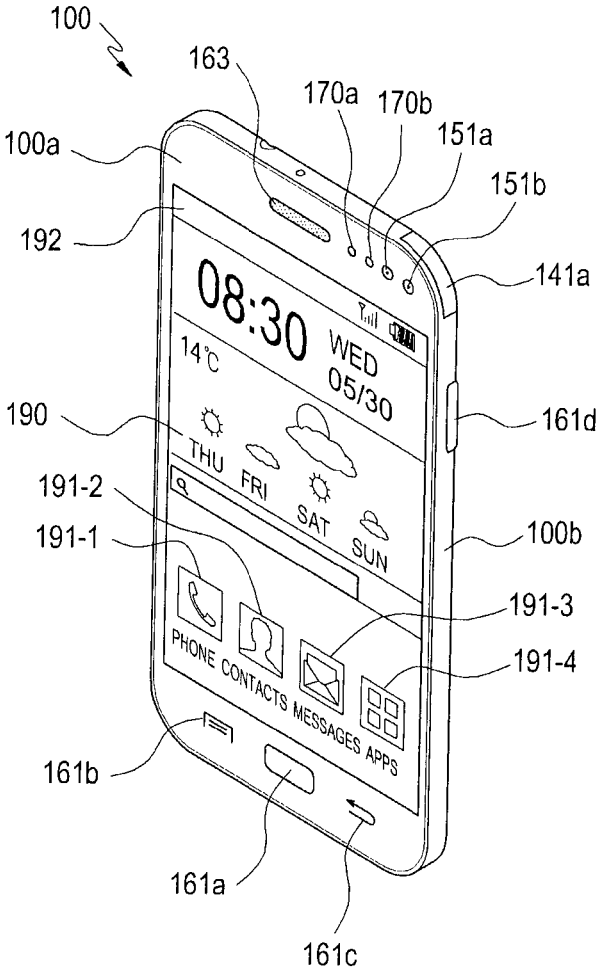
FIG. 2 is a front perspective view of an example electronic device according to an embodiment of the present invention.
Figure 3:
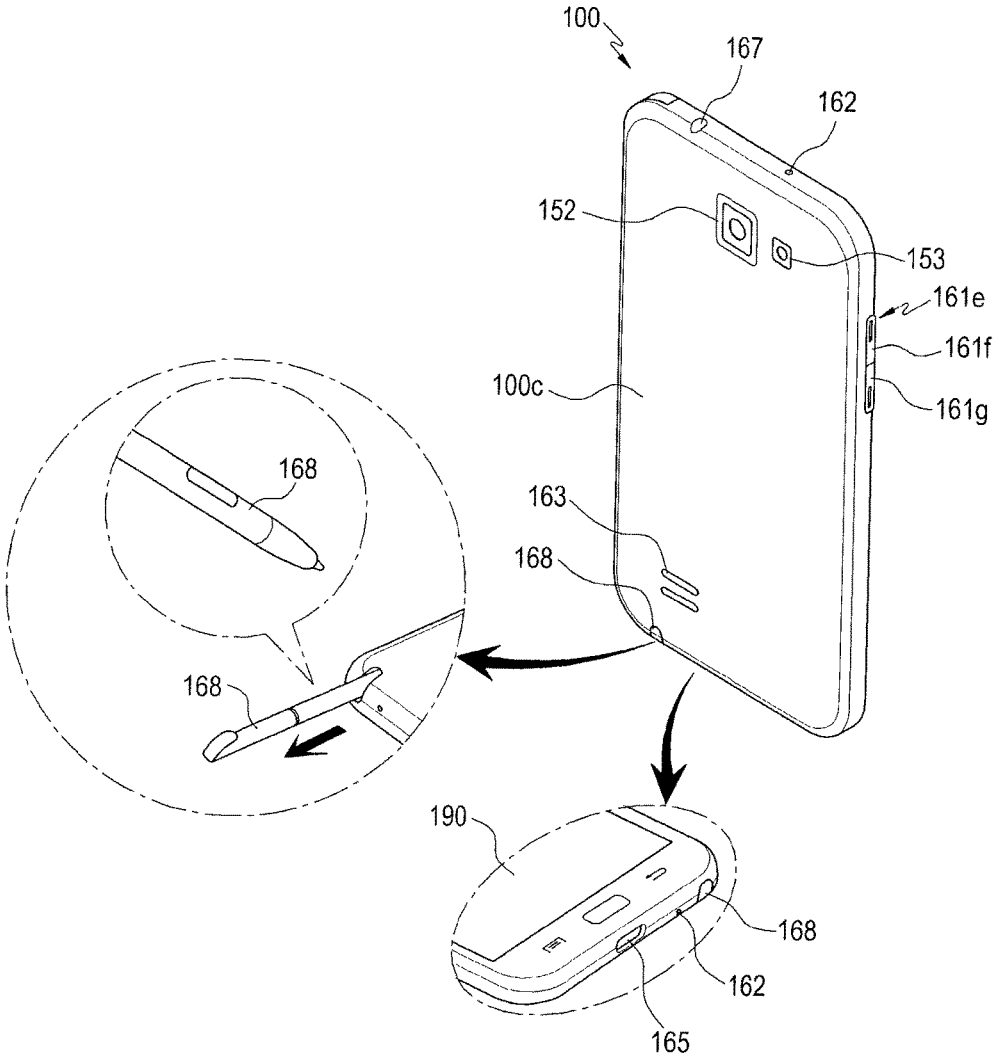
FIG. 3 is a rear perspective view of an example electronic device according to an embodiment of the present invention.

FIG. 2 is a front perspective view of an example electronic device according to an embodiment of the present invention, and FIG. 3 is a rear perspective view of an example electronic device according to an embodiment of the present invention.

Referring to FIGS. 2 and 3, the screen 190 may be disposed on a center of a front surface 100a of the electronic device 100. The screen 190 may have a large size to occupy most of the front surface 100a of the electronic device 100. FIG. 2 shows an example where a main home screen is displayed on the screen 190. The main home screen is a first screen displayed on the screen 190 when power of the electronic device 100 is turned on. Further, when the electronic device 100 has different home screens of several pages, the main home screen may be a first home screen of several different pages. Short-cut icons 191-1, 191-2, and 191-3 may be provided for executing frequently used applications. A main menu switching key 191-4, time, weather and the like may also be displayed on the home screen. The main menu switching key 191-4 displays a menu screen on the screen 190. Further, a status bar 192 may display a status of the electronic device 100 such as a battery charging status, intensity of a received signal, and a current time, and may generally be formed on an upper end of the screen 190.

A home button 161a, a menu button 161b, and a back button 161c may be formed below the screen 190.

The home button 161a displays the main home screen on the screen 190. For example, when the home button 161a is pressed when an alternate screen is displayed on the screen 190, the main home screen may be displayed on the screen 190 instead. Further, if the home button 161a is pressed while applications are executing on the screen 190, the main home screen may be redisplayed on the screen 190. In addition, the home button 161a may be used to display recently used applications or a task manager on the screen 190.

The menu button 161b provides a connection menu which may include a widget addition menu, a background changing menu, a search menu, an editing menu, an environment setup menu and the like.

The back button 161c can be used for displaying the screen which was displayed just prior to the current screen, or it may terminate the most recently used application.

One of the first camera 151a and the second camera 151b, an illuminance sensor 170a, and a proximity sensor 170b may be disposed on edges of the front surface 100a of the electronic device 100. The third camera 152, the flash 153, and the speaker 163 may be disposed on a rear surface 100c of the electronic device 100.

For example, a power/reset button 161d, a volume button 161f, a terrestrial DMB antenna (not shown) for broadcasting reception, and one or a plurality of microphones 162 may be disposed on a side surface 100b of the electronic device 100. The DMB antenna (not shown) may be fixed to the electronic device 100 or may be formed to be detachable from the electronic device 100.

Further, the connector 165 is formed on a lower side surface of the electronic device 100. A plurality of electrodes are formed in the connector 165, and the connector 165 may be connected to the external device through a wire. The earphone connecting jack 167 may be formed on an upper side surface of the electronic device 100. An earphone may be inserted into the earphone connecting jack 167.

The input unit 168 may be formed on a lower side surface of the electronic device 100. The input unit 168 may be inserted into the electronic device 100 to be stored in the electronic device 100, and withdrawn and detached from the electronic device 100 when being used.

Figure 4:
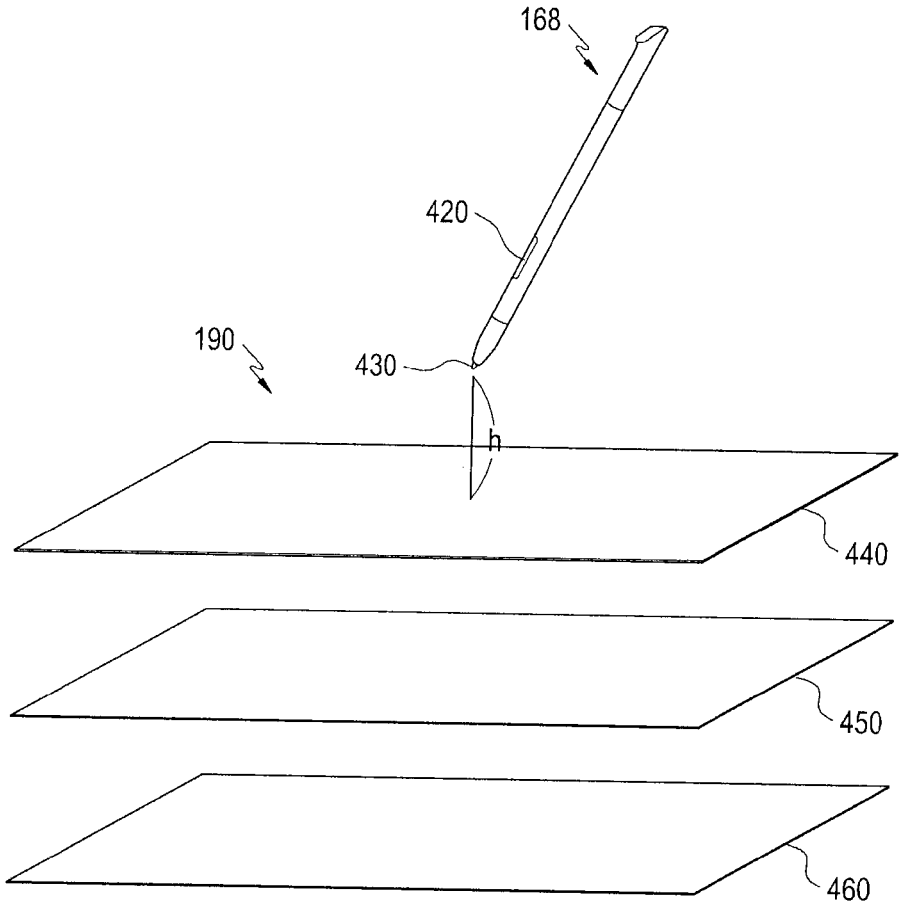
FIG. 4 illustrates an example input unit and a cross-sectional view of a screen according to an embodiment of the present invention.

FIG. 4 illustrates the input unit and an internal cross-sectional view of the screen according to various embodiments of the present invention.

As illustrated in FIG. 4, the screen 190 may include a first touch panel 440, a display panel 450, and a second touch panel 460. Further, the screen 190 may only include the display panel 450, and the screen according to the present invention may only include the display panel 450 or may include the first touch panel 440, the display panel 450, and the second touch panel 460. The display panel 450 may be an LCD, an AMOLED or the like, and display various operation states of the electronic device 100, various images according to an application execution and a service, and a plurality of objects.

The first touch panel 440 is a capacitive type touch panel which is produced by coating both sides of glass with a thin metal conductive material (for example, an Indium Tin Oxide (ITO film) to allow a current to flow on a surface of the glass. It may thus is coated with a dielectric that can store a charge. When a user's finger touches a surface of the first touch panel 440, a predetermined amount of charge is moved to the touched position by static electricity, and the first touch panel 440 recognizes a changed amount of the current according to the movement of the charges to detect the touched position. Through the first touch panel 440, all types of touches which generate static electricity can be detected.

The second touch panel 460 is an Electronic Magnetic Resonance (EMR) type touch panel, and includes an electromagnetic induction coil sensor (not shown) having a grid structure in which a plurality of loop coils are arranged in a predetermined first direction and a second direction crossing the first direction and an electronic signal processor (not shown) sequentially providing an alternative current signal having a predetermined frequency to each of the loop coils of the electromagnetic induction coil sensor. When the input unit 168 having a resonance circuit therein is placed in proximity to the loop coil of the second touch panel 460, a magnetic field transmitted from the corresponding loop coil generates a current based on mutual electromagnetic induction in the resonance circuit within the input unit 168. Further, based on the current, an induced magnetic field is generated from a coil (not shown) included in the resonance circuit within the input unit 168, and the second touch panel 460 detects the induced magnetic field from the loop coil in a signal reception state to detect a hovering position of the input unit 168 and a touch position. The electronic device 100 detects a height "h" from the first touch panel 450 to a nib 430 of the input unit 168. It may be easily understood by those skilled in the art that the height h from the first touch panel 450 of the screen 190 to the nib 430 from which inputs can be detected varies according to the capability or a structure of the electronic device 100. A hovering or a direct touch input by the input unit can generate a current based on electromagnetic induction, and can be detected through the second touch panel 460. The second touch panel 460 is used mainly for detecting the hovering or touch of the input unit 168. Further, the input unit 168 may also be referred to as an electromagnetic pen or an Electro-Magnetic Resonance (EMR) pen. In addition, the input unit 168 is different from a general pen, which does not include the resonance circuit detected through the first touch panel 440. The input unit 168 may include a button 420 which can change an electromagnetic induction value generated by a coil arranged in an area adjacent to the nib 430. A detailed description of the input unit 168 will be made below with reference to FIG. 5.

The screen controller 195 may include a first touch panel controller and a second touch panel controller. The first touch panel controller converts an analog signal received from the first touch panel 440 by a detection of a finger to a digital signal (such as, for example, X, Y, and Z coordinates) and transmits the converted digital signal to the controller 110. Further, the second touch panel controller converts an analog signal received from the second touch panel 460 by a detection of a hovering or a touch to a digital signal and transmits the converted digital signal to the controller 110. In addition, the controller 110 may control the first touch panel 440, the display panel 450, and the second touch panel 460 by using the digital signals received from the first and second touch panel controllers, respectively. For example, the controller 110 may display a screen having a predetermined shape on the display panel 450 in response to the hovering or the touch by the finger, the pen, or the input unit 168.

Accordingly, in the electronic device 100 according to various embodiments of the present invention, the first touch panel may detect the touch by the user's finger or the pen, and the second touch panel may detect the hovering or the touch by the input unit 168. Therefore, the controller 110 of the electronic device 100 may distinguishably detect the inputs by direct touch (by finger, pen or input unit 168) and inputs by hovering (by finger, pen or input unit 168). Further, although FIG. 4 illustrates only one screen, the present invention is not limited to one screen and may include a plurality of screens. Moreover, the screens are included in the housings, respectively, and connected with each other by hinges, or a single housing may include a plurality of screens. Furthermore, each of the plurality of screens includes the display panel and at least one touch panel as illustrated in FIG. 4.

Figure 5:
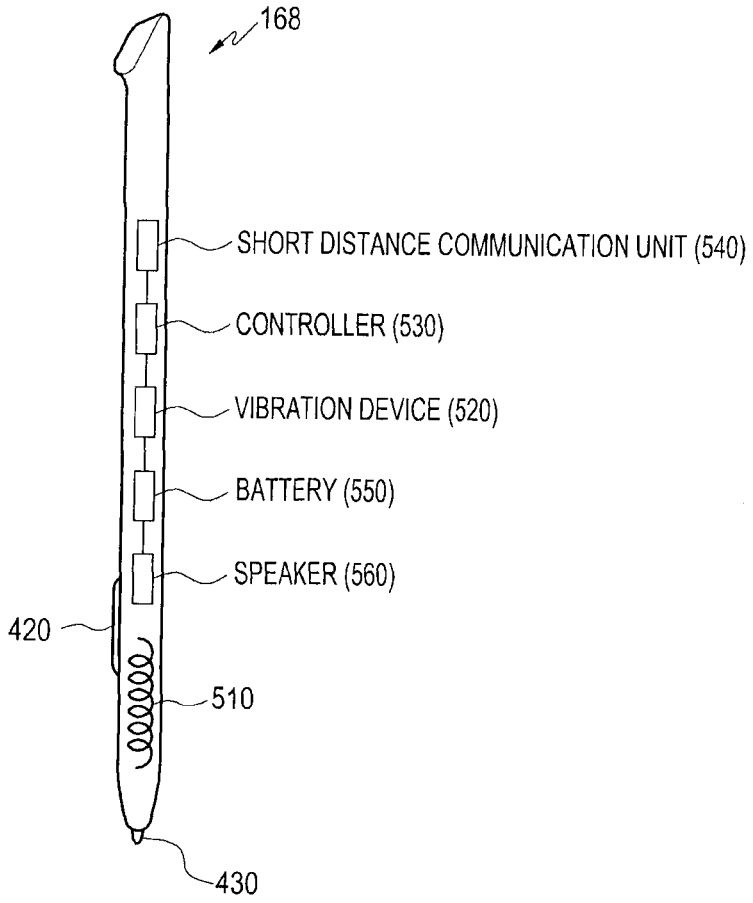
FIG. 5 is an illustration visualizing internal elements of an example input unit according to an embodiment of the present invention.

FIG. 5 is an illustration visualizing internal elements of an example input unit according to an embodiment of the present invention. The input unit 168 may comprise various elements such as the penholder (not numbered) and the nib 430 (arranged at an end of the penholder). The button 420 that can change an electromagnetic induction value generated by a coil 510m arranged within the penholder in an area adjacent to the nib 430). The vibration device 520 vibrates when a hovering input effect is generated. The controller 530 analyzes a control signal received from the electronic device 100 while hovering with the electronic device 100, and responsively controls intensity and cycle of a vibration generated by the vibration device 520, thereby providing haptic feedback functionality to the input unit 168 according to the control signal. A short distance communication unit 540 performs short distance communication with the electronic device 100. A battery 550 supplies power for the vibration of the input unit 168. A speaker 560 outputs a sound corresponding to the vibration cycle and/or the vibration intensity of the input unit 168.

The input unit 168 is configured to support a static induction-type input. When a magnetic field is formed at a predetermined position of the screen 190 by the coil 510, the screen 190 is configured to detect a position of the corresponding magnetic field to recognize a touch position.

The speaker 560 may output sounds corresponding to various signals (such as, for example, a wireless signal, a broadcasting signal, a digital audio file, or a digital video file) from the mobile communication module 120, the sub communication module 130, or the multimedia module 140 included in the electronic device 100. Further, the speaker 560 may output a sound (for example, button tone for a phone call or ringing tone) corresponding to a function performed by the electronic device 100, and one or more speakers 560 may be formed at proper positions of the housing of the input unit 168.

Figure 6:
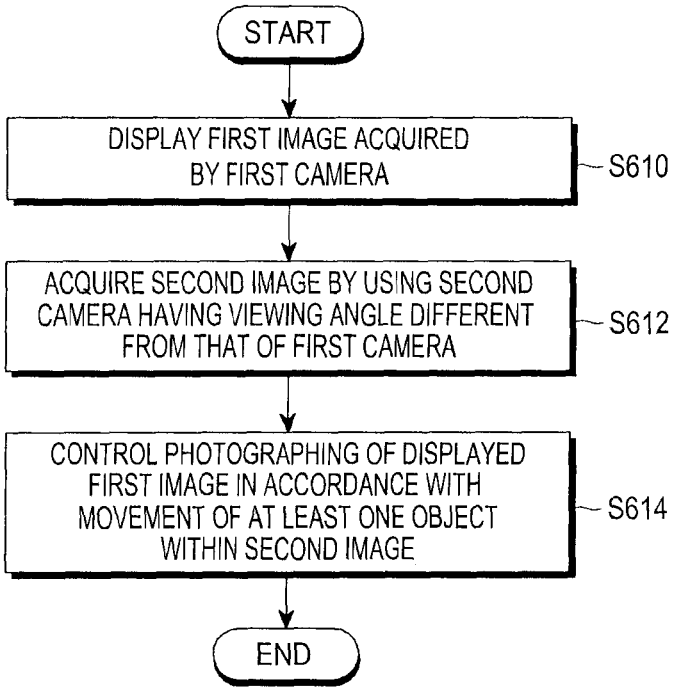
FIG. 6 is a flowchart illustrating an example sequence of steps for triggering capture of an image utilizing cameras with different viewing angles according to an embodiment of the present invention.

FIG. 6 is a flowchart illustrating an example sequence of steps for photography of an image by utilizing cameras with different viewing angles according to an embodiment of the present invention. The electronic device displays a first image acquired using a first camera in S610. The electronic device, according to an embodiment of the present invention, may have a plurality of cameras, and each of the cameras may have different viewing angles relative to one another. One or more cameras may be mounted to a front surface and a rear surface of the electronic device. One or more of the cameras may be configured to capture images and recognize a movement (with the aid of the controller 110). When a user desires to photograph a subject by using a first camera, the electronic device displays a preview image of the subject to be photographed on the screen.

The electronic device acquires a second image by using a second camera having a viewing angle different from that of the first camera in S612. The second camera captures within its field of view at least one object beyond the viewing angle of the first camera. The first camera and the second camera may be mounted to the same surface of the electronic device, or they first may be mounted to different surfaces of the electronic device. The second camera may have a larger viewing angle in comparison with the first camera to facilitate capture or recognition of movement of at least one object that is beyond the viewing angle of the first camera. The controller 110 may display the first image acquired through the first camera and overlay it with the second image acquired through the second camera on the screen. Alternatively, an icon corresponding to the at least one object may overlaid on the first image instead. Conversely, the roles of the cameras may be switched, so that the controller displays the second image acquired through the second camera to be overlaid with an object from a first image captured by the first camera, or, alternatively, an icon corresponding to the object.

When the controller detects movement in the at least one object viewable by the second camera, the controller may instruct the first camera to capture the current first image displayed in S614. The second camera has within its field of view an object, and recognized or otherwise detects a movement or gesture of the object. The movement may include various gestures such as hand motions, facial expressions, and body signs. When the movement is detected, the electronic device 100 may capture the current first image through the first camera, or alternatively execute some photographic function in accord with the particular movement of at least one object included in the second image acquired through the second camera.

The controller 110 may recognize a movement of at least one object included in the first image acquired through the first camera and photograph the second image acquired through the second camera or control the photographing in accordance with the recognition.

In the case where a particular function is to be executed, the controller 110 may retrieve a command corresponding to the detected movement. These commands are preferably pre-associated with particular gestures, and stored. The retrieved commands may include at least one of, for example, photographing the acquired first image, popping the flash, setting the timer, and performing consecutive photographing. At least one command is pre-stored in the storage unit 175 and pre-associated with at least one object gesture or movement. By way of these associations, the controller 110 may therefore capture a photograph, provide flash for the photographing, set a timer for the photographing, or execute consecutive or "burst" photographing within a predetermined time unit or to a predetermined number of pictures. For example, a gesture in which the user closes their fingers in a state where the fingers are open may be recognized as a command for photographing the acquired image, and a gesture in which the user closes the fingers one by one may be recognized as a command for setting a timer and then photographing the image, and a gesture of shaking a hand from a left side to a right side may be recognized as a command for setting a zoom level, and then photographing the image. The present invention includes various gestures other than the above-described gestures. The gestures may also be used to set a photographing mode or option of the camera, or control the photographing in accordance with each of the gestures (e.g., white balance, ISO, contrast, brightness, filtering, etc.).

Figure 7A:
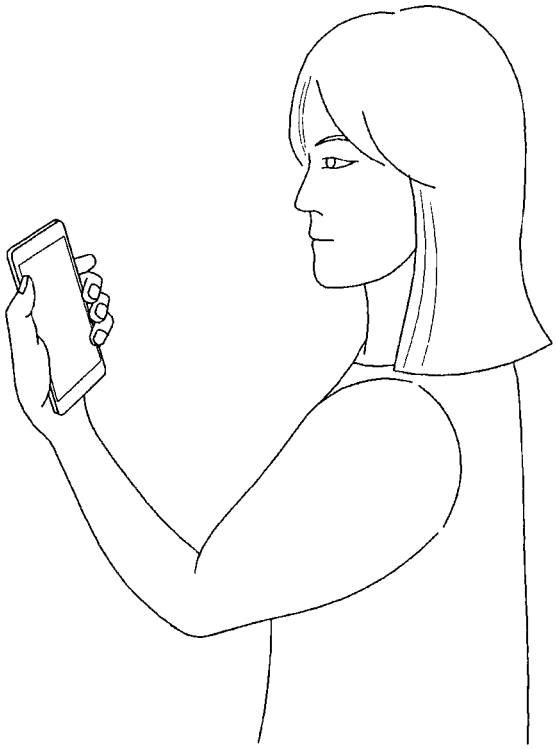
FIG. 7A is an illustration visualizing a user using a single-handed grip to support the electronic device according to an embodiment of the present invention.
Figure 7B:
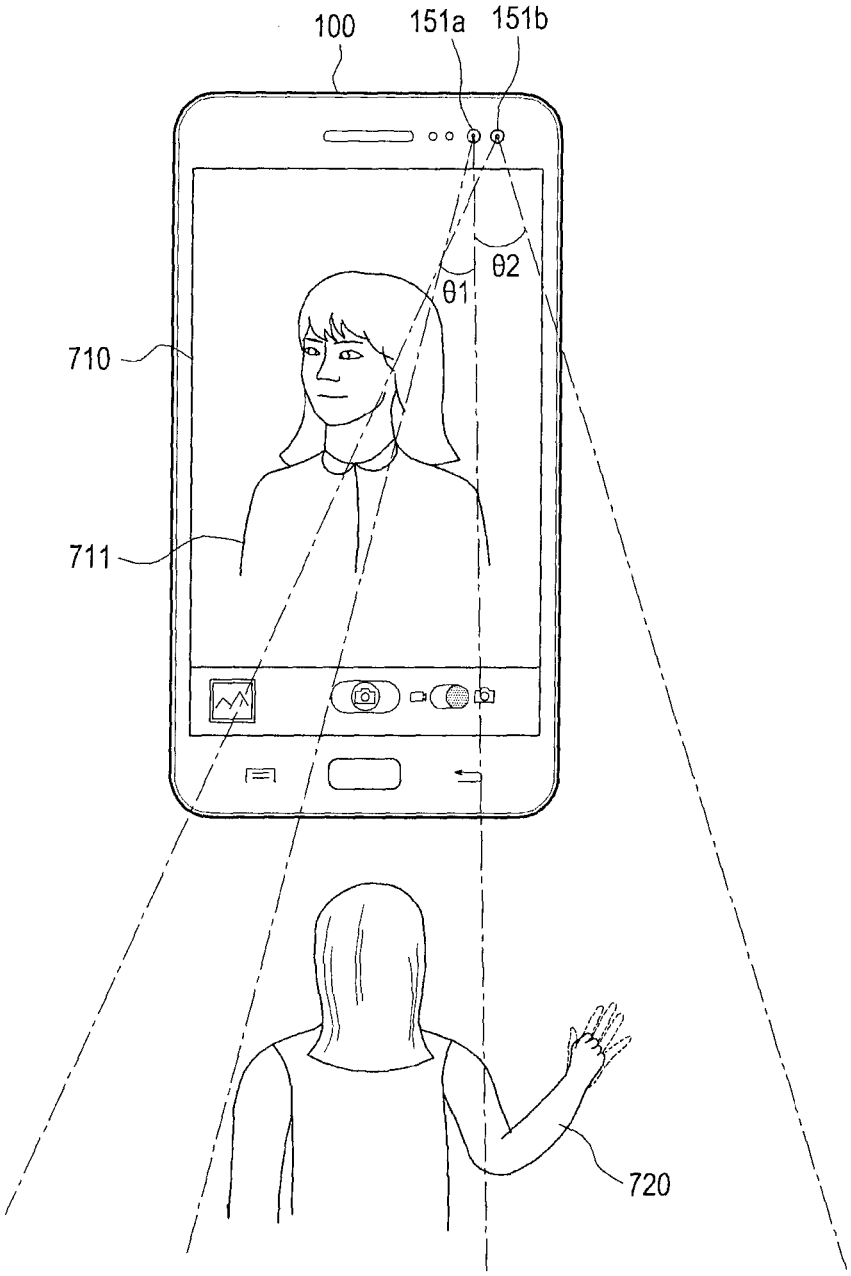
FIG. 7B is an illustration visualizing photography using a gesture command in conjunction with cameras having different viewing angles according to an embodiment of the present invention.
Figure 7C:
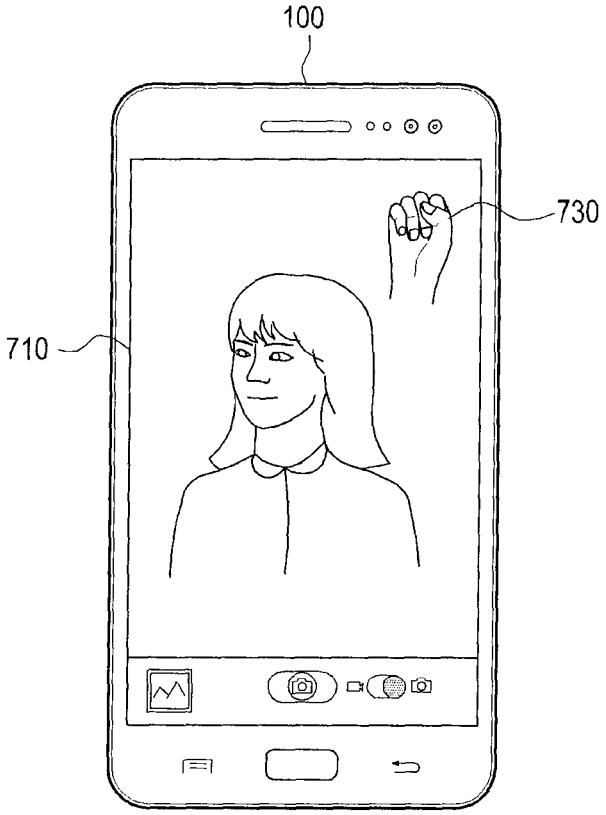
FIG. 7C is an illustration visualizing an example display screen according to an embodiment of the present invention.

FIGS. 7A to 7C illustrate examples of controlling capture of image by using gestures in combination with cameras having different viewing angles, according to an embodiment of the present invention. FIG. 7A illustrates an example where a user is using a single-handed grip to support the electronic device. FIG. 7B illustrates an example of controlling image capture by using a gesture, and cameras having different viewing angles. FIG. 7C illustrates an example of a resulting display.

FIG. 7A illustrates an example where a user is using a single-handed grip to support the electronic device. The user may for example desire to capture their face or figure. In this case, the user may use a camera mounted to the front surface of the electronic device or a camera mounted to the rear surface of the electronic device. Although FIG. 7A illustrates shows user gripping the electronic device by the left hand, it is it is obvious that the electronic device can be gripped by the right hand as well as the left hand. Further, since the electronic device includes at least one camera which can recognize a movement or a gesture, the user may photograph his/her figure after affixing a position of the camera.

FIG. 7B illustrates an example of controlling the image photographing by using a gesture command in combination with cameras having different viewing. The cameras 151a and 151b included in the electronic device may have different viewing angles θ1 and θ2. The first camera 151a has a first viewing angle θ1, and the second camera 151b has a second viewing angle θ2. The first camera 151a may be used to capture an image, and the second camera 151b may be used to detect a command gesture. The viewing angles of the first camera 151a and the second camera 151b may be preset by a manufacturer, or changed by a control of the barrel 155 according to the user's preference. The first camera 151a having the first viewing angle θ1 may, for the purposes of the present illustration, capture an image composed of a head and a body except for a right hand 720 of a user, and the second camera 151b, having the second viewing angle θ2, may photograph all of the head, body and right hand of the user. A preview image 711 acquired by the first camera 151a is displayed on a screen 710. When the preview image 711 is displayed, the user may command capture of a photograph by moving their hand 720, which is not in the viewing angle of the first camera 151a, but within the viewing angle of the second camera 151b. That is, as illustrated in FIG. 7B, when the user makes a gesture of closing fingers of the right hand, the second camera 151b recognizes the gesture and transmits a result thereof to the controller 110. The controller 110 analyzes the recognized gesture, extracts a command corresponding to the analysis, and performs the corresponding command. When the extracted command is a capture command, the first camera 151a performs the capture. As described above, the electronic device 100 may be affixed or otherwise supported a state apart from the user 720, as illustrated in FIG. 7B. Alternatively, it may be gripped as illustrated in FIG. 7A. According to the present invention, the electronic device may recognize a movement or a gesture to perform the photographing when the electronic device is gripped or spaced apart from the user. Further, according to the present invention, photographic capture may be controlled by various gestures such as a hand motion, a facial expression, and a body sign as well as the example of closing the fingers of the hand. For example, a gesture in which the user transitions from a closed first to an open hand may be recognized as a command for photographing the acquired image. A gesture in which the user closes the fingers one by one may be recognized as a command for setting a timer and then photographing the image. A gesture of shaking a hand from side to side may be recognized as a command for setting a zoom level, and then capturing the image. The present invention includes various gestures as well as the above-described gestures, and also may set a photographic feature, option or mode of the camera in accordance with each of the gestures.

FIG. 7C shows an example resulting captured image. The resulting image 710 by using may be displayed on the display. As illustrated in FIG. 7C, according to the present invention, an object 730 (for example, a hand) recognized by the second camera 151b or an emoticon or an icon corresponding to the object may be displayed on the display to reference the capture gesture, enabling a user to determine whether the right function was performed. The emoticon, icon or visualization 730 of the gesture may or may not be a part of the resulting image 710 displayed on the screen.

Figure 8:
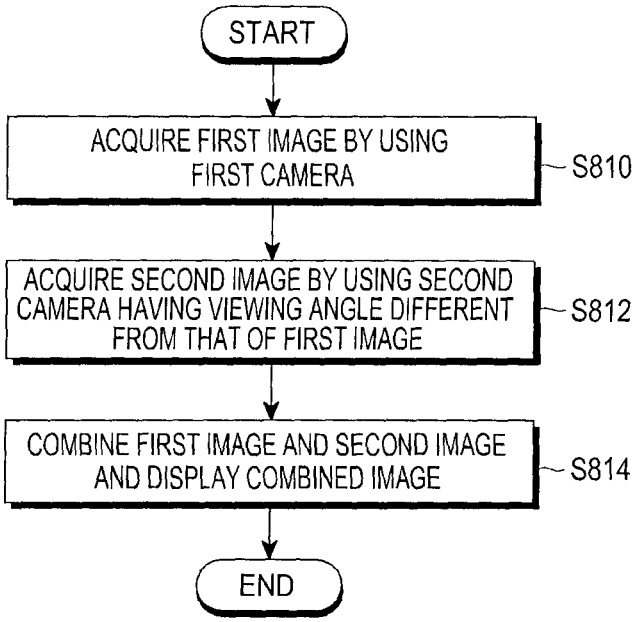
FIG. 8 is a flowchart illustrating an example sequence of steps for combining images acquired using cameras having different viewing angles according to an embodiment of the present invention.

FIG. 8 is a flowchart illustrating a process of combining images acquired using cameras having different viewing angles according to an embodiment of the present invention. The electronic device acquires a first image by using a first camera in S810. As described above, the electronic device may be equipped with a plurality of cameras. Each camera may have a different viewing angle relative to the others, and may be mounted to a front surface and a rear surface of the electronic device.

Cameras according to an embodiment of the present invention may photograph an image and also recognize a movement. When a user desires to photograph a subject by using the first camera among the plurality of cameras, the electronic device displays an image (for example, a preview image) of the subject to be photographed on the screen. The image through the first camera may be displayed on the screen 190 under a control of the controller 110.

The electronic device acquires a second image using a second camera (having a different viewing angle) in S812. The controller displays an image combined from the acquired first image and the second image in S814. When the user desires to capture an image, the present invention may acquire the image by recognizing a gesture. Therefore, the controller 110 may, through the second camera, acquire an object within the second camera's field of view that is beyond the viewing angle of the first camera. The second camera may have a larger viewing angle in comparison with the first camera, have the object within its field of view, and detect or recognize a movement of the object. Further, for example the image acquired by the second camera includes at least one object located at an area beyond the viewing angle of the first camera. The controller 110 may display the first image and overlay it with the object from the second image on the screen. The controller 110 may place the object from the second image unobtrusively with respect to the first image so that the user is not hindered in composing the photograph. The controller 110 may therefore alter both the position and size of the at least one object as it is displayed on the screen.

For example the controller 110 may display the first image acquired through the first camera to be overlaid with at least one object included in the second image acquired through the second camera or an icon corresponding to the at least one object. In addition, the controller may display the second image acquired through the second camera to be overlaid with at least one object included in the first image acquired through the first camera or an icon corresponding to the at least one object. As described above, an image generated by displaying the overlaid first image and second image on the screen may be photographed. The present invention may capture the first image in response to a movement the object. The object includes any anatomically appropriate portion of a user's body, and the motions may include a hand motion, a facial expression, and a body sign, etc.

Figure 9A:
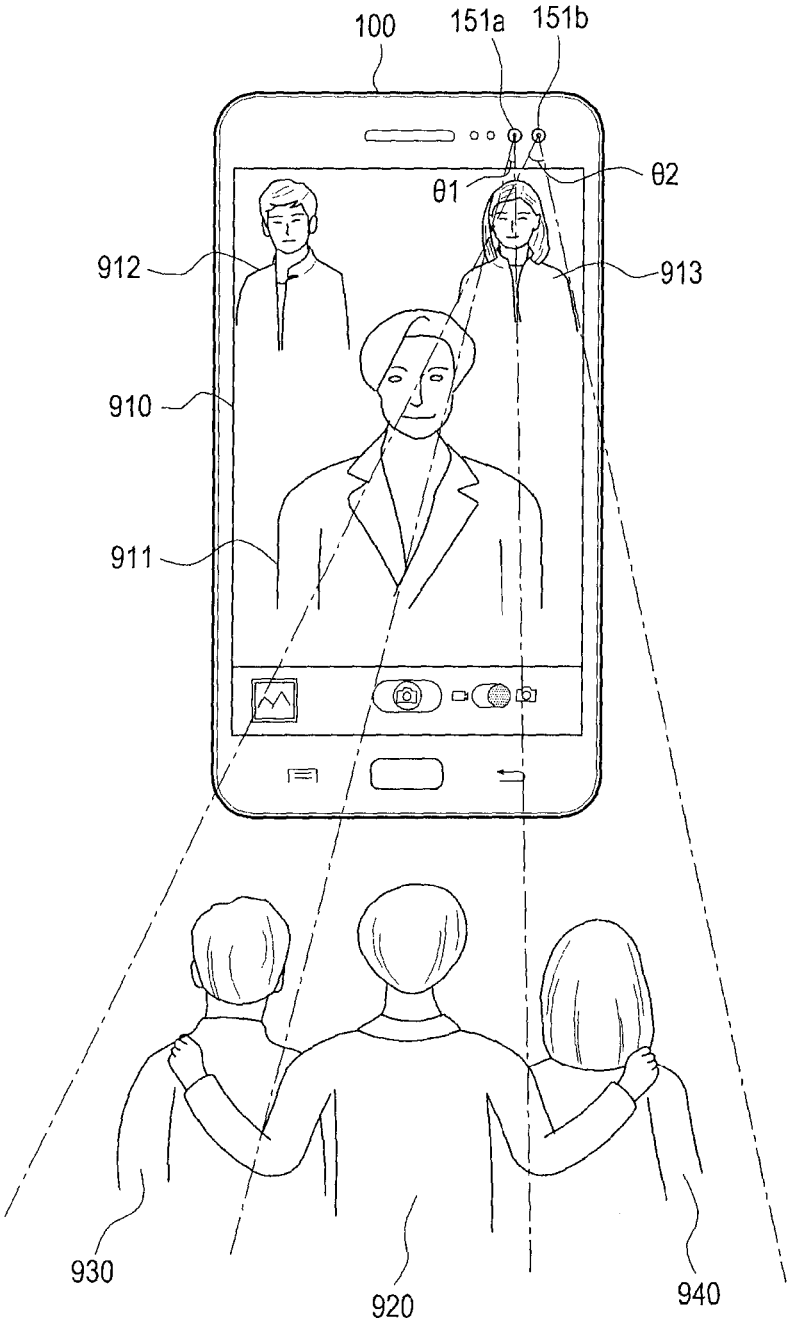
FIG. 9A is an illustration visualizing an example combination of images acquired using cameras having different viewing angles located at a front surface of an electronic device, according to an embodiment of the present invention.
Figure 9B:
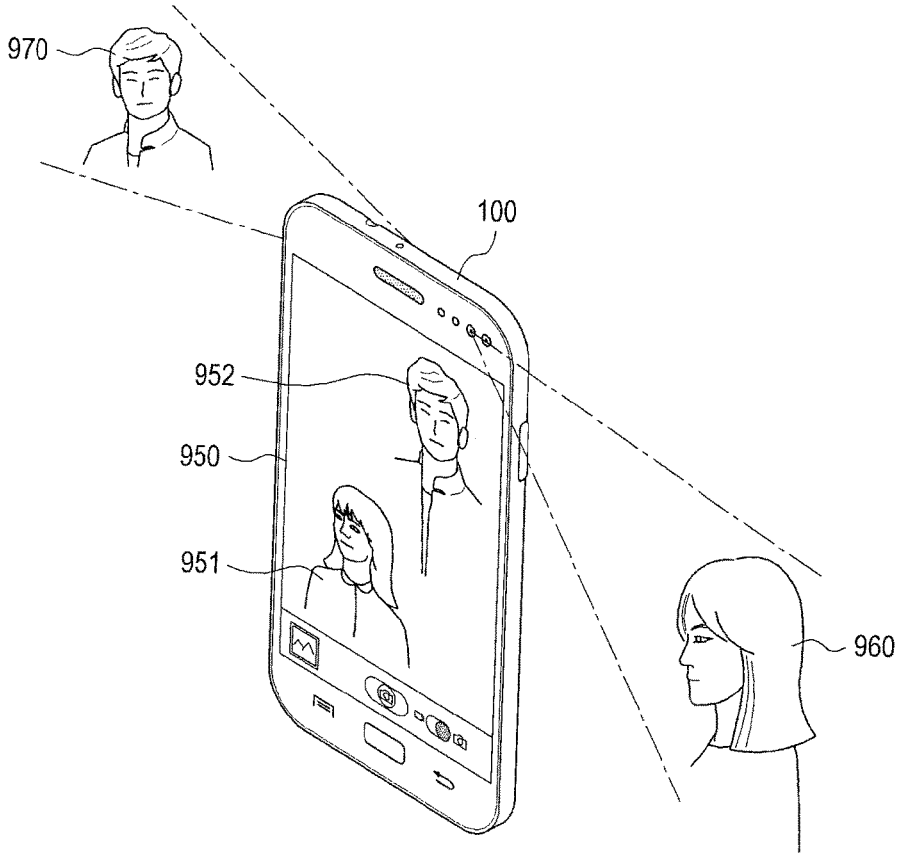
FIG. 9B is an illustration visualizing an example combination of images acquired using cameras having different viewing angles located at a front surface and a rear surface of an electronic device, according to an embodiment of the present invention.

FIGS. 9A and 9B illustrate examples of combining images acquired using cameras having different viewing angles according to an embodiment of the present invention. FIG. 9A illustrates an example combination of images acquired front surface mounted cameras having disparate viewing angles. FIG. 9B illustrates an example combination of images acquired using the cameras mounted on the front surface and the rear surface of the electronic.

Referring to FIG. 9A, the electronic device 100 has two cameras 151a and 151b formed on the front surface thereof. The cameras 151a and 151b included in the electronic device 100 may have different viewing angles θ1 and θ2. The first camera 151a has a first viewing angle θ1, and the second camera 151b has a second viewing angle θ2. The first camera 151a may be used primarily to photograph an image, and the second camera 151b may be used primarily to detect movement. The viewing angles of the first camera 151a and the second camera 151b may be preset by a manufacturer, or alternatively, they may be changed by a manipulation of the barrel 155 according to user preference. The first camera 151a may include within its field of view a first user 920, and the second camera 151b may contain within its field of view all of the first user 920, and second user 930 and third user 940. A preview image 911 acquired by the first camera 151a is displayed on a screen 910. Preview images 912 and 913 acquired by the second camera 151b are also displayed on the screen 910. The controller 110 may coordinate the display of the disparate preview images captured by the first and second cameras 151a and 151b. That is, for example, the controller 110 may display the image 911 of the first user 920 acquired by the first camera 151a on a center of the screen 910, and display the image 912 of the second user 930 and the image 913 of the third user 940 acquired by the second camera 151b on a part of the screen 910.

While the images are still being previewed, they may be altered according to user preference. For example, a position of each of the images 911 to 913 may be variably controlled by a drag, a gesture, or a touch on the screen 910. Similarly, the controller 110 may control both size and position of images or objects acquired by the second camera 151b, and thereby aid the user in coordination of the display of the images on the screen 910.

For example when the images acquired by the first camera 151a and the second camera 151b are displayed on the screen 910 of the electronic device 100, the electronic device 100 may photograph the displayed images. For example, when the first user 920 exists within the viewing angle of the first camera 151a and the second and third users exist beyond the viewing angle of the first camera 151a but exist within the viewing angle of the second camera 151b, if one of the first to third users makes a gesture of closing fingers of a right hand, the first or second camera 151a or 151b recognizes the gesture and transmits a result thereof to the controller 110.

When a desired composition has been achieved, the controller 110 may capture the displayed preview images in the configuration displayed. Capture may be conducted by, for example, a user gesture. For example, if one of the users closes the fingers of their right hand, the first or second camera 151a or 151b may recognize the gesture and transmit a result thereof to the controller 110. Alternatively, the controller 110 may monitor the preview imagery for recognition of a command gesture. Thus, the controller 110 may retrieve a command corresponding to the gesture, and execute the corresponding command. When the extracted command is a capture command, the controller 110 may capture the image currently displayed on the screen 910 in the configuration displayed. The electronic device 100 illustrated in FIG. 9A may be placed on some support structure (such as a ledge, a tripod, etc.) to facilitate capturing the image when the user is not holding the electronic device 100. Alternatively, it may be held by the user. In either case, the electronic device 100 may utilize the recognition of movements or gestures to control photography. As described, the electronic device 100 may be controlled by various gestures such as a hand motion, a facial expression, and a body sign. Hand motions may include gestures such as closing the fingers of the hand. For example, a gesture in which the user closes fingers in a state where the fingers are open may be recognized as a command for photographing the acquired image. A gesture in which the user closes the fingers one by one may be recognized as a command for setting a timer and then photographing the image. A gesture of shaking a hand from side to side may be recognized as a command for setting a zoom level of a composition, and then capturing an image. The present invention includes any gesture, and should not be construed as limited to the above described gestures. The gesture or motion may also be used to set a photography function, option or mode.

Referring to FIG. 9B, the first camera 151a may be formed on the front surface of the electronic device 100, and the third camera 152 formed on the rear surface of the electronic device 100. The first camera 151a and the third camera 152 may have different viewing angles, and one or both may be configure to detect movement (in conjunction with, for example, a computer processor). The first camera 151a may have within its field of view a first user 960, situated in front of the electronic device 100, and the third camera 152 may similar have within its field of view a user 970, located behind the electronic device 100. Therefore, a preview image may be formed on the screen 950, to help the user compose the final photograph. Both the image 951 acquired by the first camera, and the image 952 acquired by the third camera, are displayed on the screen 950. The controller 110 may arrange the display of the images, with, for example, image 951 displayed at a first position of the screen 950 and image 950 displayed at a second part of the screen 950, so that the two images are not obtrusive with respect to one another. The relative positioning, size or any configuration of the images may further be configured by a user. For example, the size of placement of images 951 and 952 may be controlled and altered by a drag, a gesture, or a touch input to the screen 950.

Further, at least one image acquired by the camera located at the rear surface is displayed on a part of the screen 950, and a display position may be variably changed. The controller 110 may control a size of at least one image or object acquired by the camera located at the rear surface, and display the controlled image or object on the screen 950.

With the photograph thus composed, the electronic device 100 may at any desired time capture the final photograph. The first user 960 (or the second user 970) may form a gesture of closing fingers of the right hand. The first camera 151a may thus detect the gesture (or the third camera 152, if the second user 970 is performing the gesture). The controller 110 analyzes the gesture, retrieves a command corresponding to the analysis, and executes the corresponding command. If the retrieved command is a capture photograph command, the controller 110 may instruct the first camera and the second camera to capture the respective images, as currently previewed on the screen 950.

The electronic device 100, if placed away from the users 960 and 970, may be supported by some structure, such as something in the environment, a support like a tripod, etc. Alternatively, it may be supported by the hand of the first user 960, or the second user 970. A gesture may be used to control the photographic functions of the electronic device in either case. Various gestures and motions may be used, such as a hand motion, a facial expression, and a body sign. For example, a gesture in which the user closes fingers in a state where the fingers are open may be recognized as a command for capturing the image. A gesture in which the user closes the fingers one by one may be recognized as a command for setting a timer and then photographing the image. A gesture of shaking a hand from side to side may be recognized as a command for setting a zoom level and then photographing the image. The present invention may incorporate any desired gesture besides the above described gestures. Gestures and movements may also be used to set a photographic function, option or mode of the camera.

Figure 10:
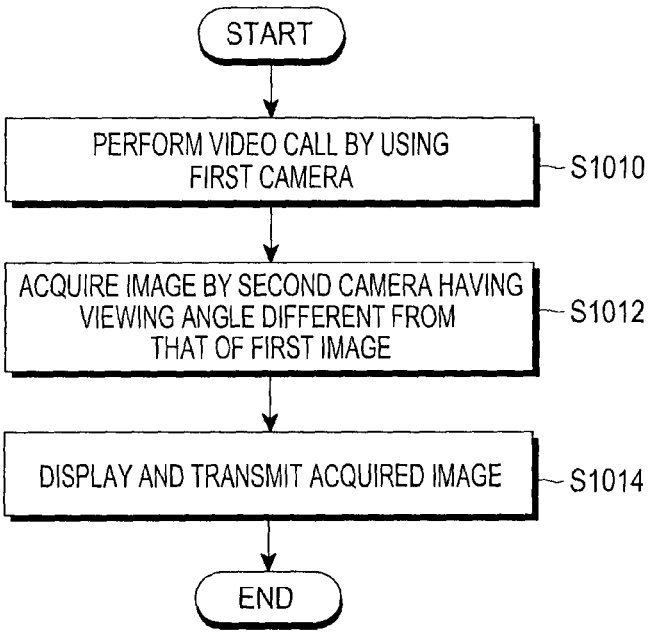
FIG. 10 is a flowchart illustrating an example sequence of steps for providing a video call by using cameras having different viewing angles according to an embodiment of the present invention.

FIG. 10 is a flowchart illustrating an example sequence of steps for providing a video call by using cameras having different viewing angles according to an embodiment of the present invention. The electronic device performs a video call by using a first camera in S1010. The user may perform the video call with a counterpart by using at least one of a plurality of cameras included in the electronic device 100. The plurality of cameras may be mounted to the front surface or the rear surface of the electronic device. In the video call, the first camera photographs a face or figure of the user of the electronic device, and displays the face or figure on the screen. Further, the controller 110 may transmit the image displayed on the screen and a received voice input from the user to a counterpart electronic device through a communication network.

The electronic device acquires images by a first camera and a second camera having a viewing angle different from that of the first camera in S1012. The electronic device 100 should be construed as limiting to having two cameras having different viewing angles. The electronic device 100 may alternatively have a plurality of cameras having a plurality of disparate viewing angles. A first camera may be utilized to capture the subject of the photograph (such as a user's face or figure), while a second camera may capture at least one object beyond the viewing angle of the first camera, and monitor for a movement of the object (i.e., to capture a gesture-based command).

The electronic device 100 displays the acquired image to the user, and transmits the image to the counterpart electronic device in S1014. Images acquired by the first and second cameras may be displayed on the screen, and also transmitted to the counterpart electronic device. Similarly, the controller 110 displays at least one image received from the counterpart electronic device, on the screen and outputs the received voice through the speaker 163.

Figure 11A:
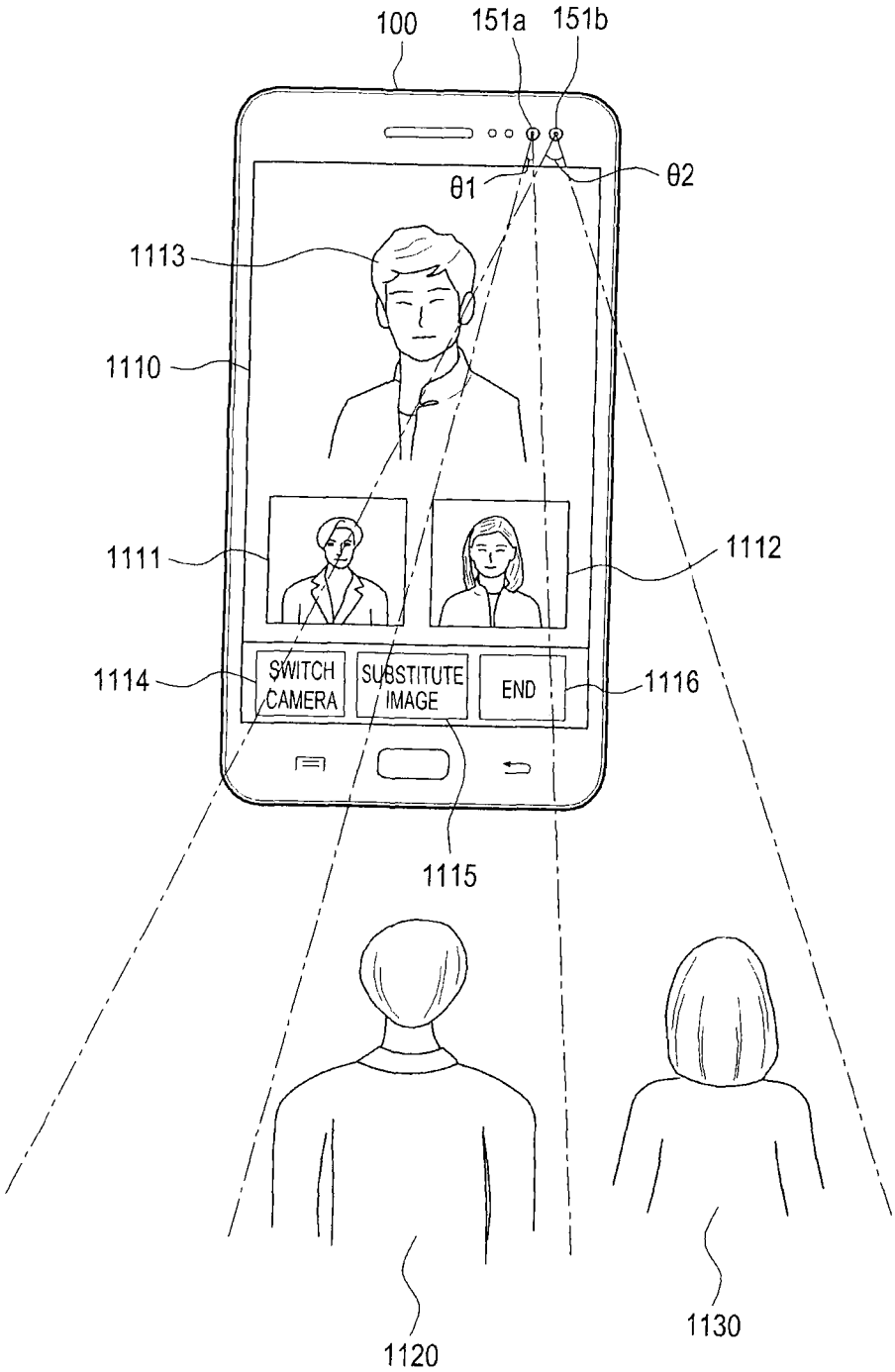
FIG. 11A is an illustration visualizing an example performance of a video call by using cameras having different viewing angles according to an embodiment of the present invention.

FIG. 11A is an illustration visualizing an example video call utilizing cameras having different viewing angles according to an embodiment of the present invention. A screen 1110 of the electronic device 100 may display images 1111 and 1112 acquired by the first and second cameras 151a and 151b, in addition to the image 1113 received from the counterpart electronic device (not shown). The controller 110 coordinates the video call by managing video inputs from the cameras 151a and 151b, coordinating the display of images 1111, 1112 and 1113 on the display 1110, provides menu button functionality 1114, 1115, and 1116, and directs the input and output of sound from microphone and speaker units (not shown). The cameras 151a and 151b included in the electronic device may have different viewing angles θ1 and θ2. The first camera 151a has a first viewing angle θ1, and the second camera 151b has a second viewing angle θ2. The first camera 151a may be a camera that mainly photographs an image, and the second camera 151b may be a camera that detects a movement. Inversely, the first camera 151a may be a camera that detects a movement, and the second camera 151b may be a camera that photographs an image. The viewing angles of the first camera 151a and the second camera 151b may be preset by a manufacturer, or may be altered by manipulation of the barrel 155 according to user preference. The first camera 151a may capture within the first viewing angle θ1 a first user 1120, resulting in image 1111. The second camera 151b may capture within the second viewing angle θ2 the first user 1120 and a second user 1130, resulting in the image 1112. In the video call, the image 1111 acquired by the first camera 151a and an image 1112 acquired by the second camera 151b may be displayed on the screen 1110.

The controller 110 displays image 1111 and image 1112 screen 1110, showing users 1120 and 1130 how they appear to the other video caller, respectively. Further, the controller 110 may display an image 1113 received from the counterpart electronic device on the screen, showing how the video caller appears. The controller 110 may coordinate the display of image 1111, image 1112 and image 1113 so that the images are unobtrusive relative to one another. For example, image 111 may be placed in a lower left hand side of screen 1110, image 1112 may be placed in a lower right hand side of screen 1110, and image 1113 may be placed centrally towards the top of 1113. Controller 110 may also scale the size of the images (as depicted) for better visual organization or emphasis. A position or size of each image 1111 to 1113 may be variably controlled by a drag, a gesture, or a touch on the screen 1110, according to user preference. The controller may display the image 1113 as a relatively larger image, while images 1111 and 1112 may be displayed smaller and less prominently. Other arrangements are possible. For example, the image 1113 may be displayed on the lower part of the screen 1110, while the images 1111 and 1112 acquired by the first and second cameras may be displayed on the upper part of the screen, with a larger size than that of the image 1113.

Menu buttons "switch camera" 1114, "substitute image" 1115, and "end" 1116 may be placed towards a lower end of the screen 1110. The functions correspond to actions to be applied to a video call. The switch camera button 1114 may switch a camera used for the video call to another camera. For example, when the first camera 151a mounted to the front surface of the electronic device photographs, and the switch camera button 1114 is selected, other cameras, such as the second camera 151b or the third camera (not shown) may be activated, and the image 111 (for example) replaced with the input from the new camera. The substitute image button 1115 shows a different or substitute image to the counterpart video caller, replacing the image 1111 or 1112 captured by the camera 151a or 151b. The end button 1116 may end the video call.

As illustrated in FIG. 11A, the images 1111 and 1112 acquired by the first and second cameras having different viewing angles may be displayed on the electronic device 100 and also may be transmitted to the counterpart electronic device.

Figure 11B:
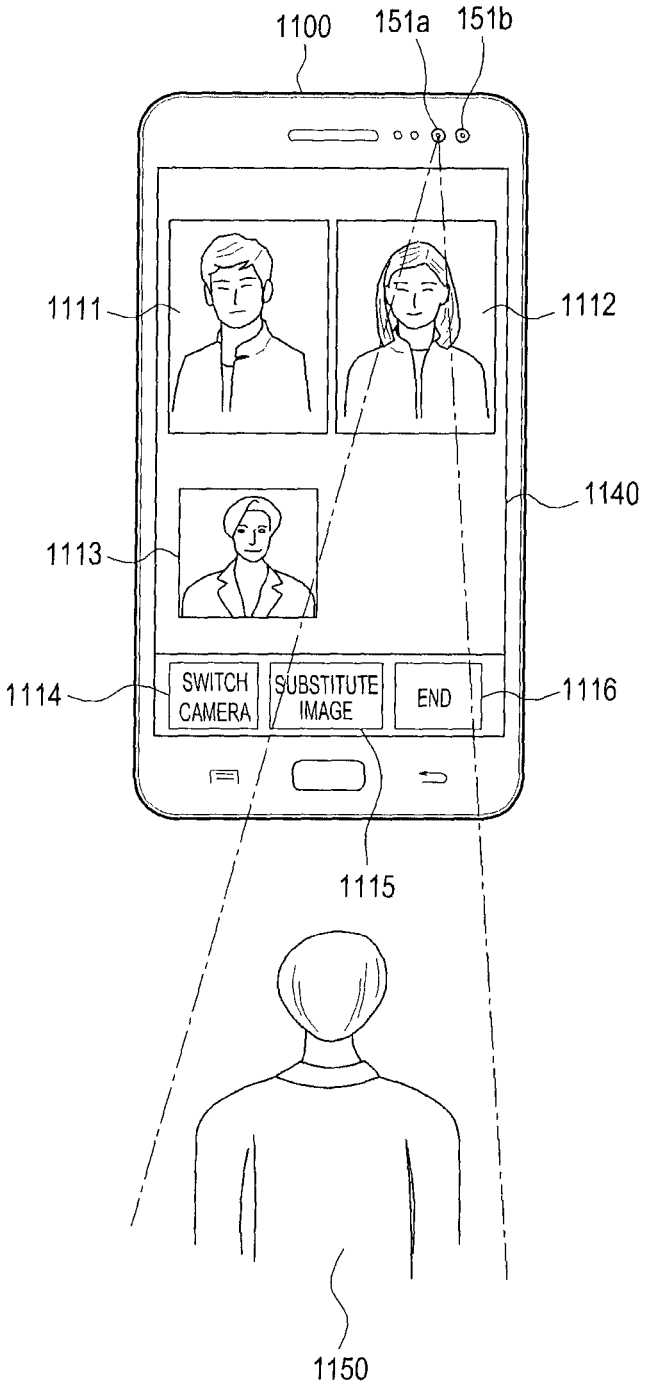
FIG. 11B is an illustration visualizing an example counterpart electronic device in a video call using cameras of an electronic device according to an embodiment of the present invention.

FIG. 11B is an illustration visualizing an example video call using cameras of the electronic device according to an embodiment of the present invention. An electronic device 1100 may have first and second cameras 151a and 151b formed on a front surface thereof. A screen 1140 may display images acquired by the first camera 151a and one or more images received from the counterpart electronic device, therefore displaying image 1113 of a local user, and images 1111 and 1112 of remote users participating in the video call.

The electronic device 1100 may display the images 1111 and 1112 on an upper part of the screen with a larger more prominent size. Image 1113 may be displayed on a lower part of the screen with a smaller less prominent size. As described above with respect to FIG. 11A, the camera switching button 1114, the substitutive image button 1115, and the end call button 1116 may be situated at a lower end of the screen, and correspond to functions applicable to a video call. The camera switching button 1114 switches a camera used for the video call to another camera, showing a different image produced by the camera 151a capturing the user. The end call button 1116 ends the video call.

According to the present invention, by analyzing data input through an application such as a memo note, extracting similar data to the analyzed data, and displaying the extracted data, it is possible to prevent similar data from being written and to easily find and then combine data related to the input data, thereby more efficiently managing data such as the memo note.

It may be appreciated that the embodiments of the present invention can be implemented in software, hardware, or a combination thereof. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It is noted that the memory included in the electronic device is one example of a program including commands for implementing various embodiments of the present invention or a machine-readable storage medium suitable for storing programs. Therefore, embodiments of the present invention provide a program including codes for implementing a system or method claimed in any claim of the accompanying claims and a machine-readable device for storing such a program. Moreover, such a program as described above can be electronically transferred through an arbitrary medium such as a communication signal transferred through cable or wireless connection, and the present invention properly includes the things equivalent to that.

Further, the device can receive the program from a program providing apparatus connected to the device wirelessly or through a wire and store the received program. The program providing apparatus may include a program including commands for controlling an image display of the electronic device, a memory or a storage unit for storing information required for providing the image display to a user by the electronic device, a communication unit for performing wired or wireless communication with the electronic device, and a controller for transmitting the corresponding program to a host apparatus according to a request of the electronic device or automatically.

Meanwhile, although specific embodiments have been described in the detailed descriptions of the present invention, it is apparent that various modifications may be carried out without departing from the scope of the present invention. Therefore, the scope of the present invention should not be defined as being limited to the embodiments, but should be defined by the appended claims and equivalents thereof.

Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

The functions and process steps herein may be performed automatically or wholly or partially in response to user command. An activity (including a step) performed automatically is performed in response to executable instruction or device operation without user direct initiation of the activity.

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. § 101 and does not constitute software per se.

What is claimed is:

1. A mobile communication device comprising:

a first camera and a second camera disposed on a first side of the mobile communication device, the first camera having a first viewing angle and the second camera having a second viewing angle larger than the first viewing angle;

a touchscreen; and a processor adapted to:

acquire a first image including at least one first object external to the mobile communication device using the first camera, and a second image including the at least one first object in the first image and at least one second object excluded from the first image using the second camera;

display, via the touchscreen, a third image combined with the first image on the second image as a preview image; and photograph the third image based at least in part on a user input.

2. The mobile communication device of claim 1, further comprising a third camera disposed on a second side of the mobile communication device, the second side opposite to the first side.

3. The mobile communication device of claim 1, wherein the first camera is positioned in proximity of the second camera.

4. The mobile communication device of claim 1, wherein each of the first and second cameras includes a lens and an image sensor.

5. The mobile communication device of claim 1, wherein the first and second viewing angle is unchangeable by a user.

6. The mobile communication device of claim 1, wherein the third image includes the object acquired via the first camera and the other object acquired via the second camera.

7. The mobile communication device of claim 1, wherein the third image includes at least one portion of the first image in the middle of the third image.

8. The mobile communication device of claim 1, wherein at least one portion of the first image is generated by scaling the first image in relation with the second image.

9. The mobile communication device of claim 1, wherein at least one portion of the second image is generated by scaling the second image in relation with the first image.

10. The mobile communication device of claim 1, further comprising another touchscreen adapted to receive the user input.

11. The mobile communication device of claim 1, the third image includes one or more icons in relation with the photographing.

12. The mobile communication device of claim 1, wherein the processor is adapted to:

terminate the displaying of the third image based at least in part on another user input received via a button positioned below the third image.

13. A method of processing an image using a mobile communication device including a first camera and a second camera disposed on a same side of the mobile communication device, the method comprising:

acquiring a first image including at least one first object using the first camera having a first viewing angle and a second image including the at least one first object in the first image and at least one second object excluded from the first image using the second camera having a second viewing angle larger than the first viewing angle;

displaying, via a touchscreen operatively coupled with the mobile communication device, a third image combined with the first image on the second image as a preview image; and photographing the third image based at least in part on a user input.

14. The method of claim 13, further comprising:

setting a timer in relation with the photographing in response to the user input.

15. The method of claim 13, wherein the third image includes a first object inside of a first viewing angle and a second object outside of the first viewing angle.

16. The method of claim 13, further comprising:

displaying at least one icon, on the third image, corresponding to at least one object recognized using the second image.

17. A mobile communication device comprising:

a first camera and a second camera disposed on a first side of the mobile communication device, the first camera having a first viewing angle and the second camera having a second viewing angle larger than the first viewing angle;

a touchscreen; and a processor adapted to:

acquire a first image including at least one first object via the first viewing angle and a second image including the at least one first object in the first image and at least one second object excluded from the first image via the second viewing angle;

combine at least one portion of the first image and at least one portion of the second image; and display, via the touchscreen, the combined image as a preview image in relation with a photographing function of the mobile communication device, *and at least one user interface element corresponding to the photographing function*, wherein the combined image [is combined with], *which comprises the at least one portion of* the first image [on] *combined with the at least one portion of* the second image, *is displayed as the preview image in a rectangular preview display area of the touchscreen such that the at least one portion of the first*

*image is displayed in a central region of the rectangular preview display area and the at least one portion of the second image is displayed in a remaining region of the rectangular preview display area.*

18. The mobile communication device of claim 17, wherein the combined image includes the at least one portion of the first image and the at least one portion of the second image as scaled based at least in part on a user input.

*19. The mobile communication device of claim 18, wherein the user interface element comprises a menu button.*

*20. A mobile communication device comprising:*

*a first camera and a second camera disposed on a first side of the mobile communication device, the first camera having a first viewing angle and the second camera having a second viewing angle larger than the first viewing angle;*

*a touchscreen; and*

*a processor adapted to:*

*acquire a first image including at least one first object via the first viewing angle and a second image including the at least one first object in the first image and at least one second object excluded from the first image via the second viewing angle;*

*combine at least one portion of the first image and at least one portion of the second image; and*

*display, via the touchscreen, the combined image as a preview image in relation with a photographing function of the mobile communication device such that the at least one first object is displayed in a central region of the preview image and at least one portion of the at least one second object is displayed in a peripheral region of the preview image substantially surrounding the central region.*

* * * * *